US010324964B2

(12) United States Patent
Damodaran et al.

(10) Patent No.: US 10,324,964 B2
(45) Date of Patent: Jun. 18, 2019

(54) METHOD AND SYSTEMS FOR ENHANCED ONTOLOGY ASSISTED QUERYING OF DATA STORES

(71) Applicant: MASSACHUSETTS INSTITUTE OF TECHNOLOGY, Cambridge, MA (US)

(72) Inventors: Suresh K. Damodaran, Acton, MA (US); Benjamin D. O'Gwynn, Newton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 833 days.

(21) Appl. No.: 14/546,355

(22) Filed: Nov. 18, 2014

(65) Prior Publication Data
US 2017/0300558 A1 Oct. 19, 2017

Related U.S. Application Data

(63) Continuation-in-part of application No. 14/157,174, filed on Jan. 16, 2014, now Pat. No. 9,367,610.

(51) Int. Cl.
*G06F 16/332* (2019.01)
*G06F 16/33* (2019.01)
*G06F 16/242* (2019.01)
*G06F 16/36* (2019.01)

(52) U.S. Cl.
CPC ........ *G06F 16/332* (2019.01); *G06F 16/2423* (2019.01); *G06F 16/334* (2019.01); *G06F 16/367* (2019.01)

(58) Field of Classification Search
CPC ......... G06F 17/30734; G06F 17/30675; G06F 17/30
USPC ................. 707/756, 602, 706, 778, 999.001, 707/999.002, 999.005, 999.102, E17.014; 365/189.05, 194, 230.06, 230.08
See application file for complete search history.

(56) References Cited

U.S. PATENT DOCUMENTS 6,609,123 B1   8/2003  Cazemier et al.
7,620,542 B2 * 11/2009  Sheu ................. G06F 16/24522
                                                          704/9

(Continued)

OTHER PUBLICATIONS

Response to Office Action dated Sep. 29, 2015 corresponding to U.S. Appl. No. 14/157,174; Response filed on Dec. 29, 2015; 13 Pages.

(Continued)

*Primary Examiner* — Jeff A Burke
*Assistant Examiner* — Kamal K Dewan
(74) *Attorney, Agent, or Firm* — Daly, Crowley, Mofford & Durkee, LLP

(57) ABSTRACT

Systems and methods are disclosed that provide high-level, ontology-based analysis of low-level data stored within an unstructured key/value store. The systems and methods allow an analyst to make sense of massive amounts of data from diverse sources without having any knowledge of the underlying physical data storage. The systems and methods provide flexible ontology assisted addressing, embedding such addressing in existing query languages such as widely used Structured Query Language (SQL), and returning results and provenance information of the results.

26 Claims, 11 Drawing Sheets

(56) References Cited

U.S. PATENT DOCUMENTS

| | | | |
|---|---|---|---|
| 7,783,658 B1* | 8/2010 | Bayliss | G06F 17/30705 707/765 |
| 8,566,347 B1 | 10/2013 | Patil et al. | |
| 2004/0015814 A1 | 1/2004 | Trappen et al. | |
| 2005/0022114 A1 | 1/2005 | Shanahan et al. | |
| 2005/0120021 A1 | 6/2005 | Tang et al. | |
| 2005/0222977 A1* | 10/2005 | Zhou | G06F 17/30864 |
| 2006/0167856 A1* | 7/2006 | Angele | G06F 17/30545 |
| 2006/0206883 A1* | 9/2006 | Sabbouh | G06F 17/30893 717/146 |
| 2006/0248045 A1 | 11/2006 | Toledano et al. | |
| 2007/0208726 A1 | 9/2007 | Krishnaprasad et al. | |
| 2008/0172353 A1* | 7/2008 | Lim | G06F 17/30507 706/47 |
| 2010/0185643 A1 | 7/2010 | Rao et al. | |
| 2012/0117048 A1* | 5/2012 | Rosenoff | G06Q 50/18 707/706 |
| 2012/0284259 A1 | 11/2012 | Jehuda | |
| 2014/0006404 A1* | 1/2014 | McGrew | G06F 17/30303 707/737 |
| 2014/0059017 A1 | 2/2014 | Chaney et al. | |
| 2014/0200989 A1 | 7/2014 | Cohen Kassko et al. | |
| 2014/0258212 A1 | 9/2014 | Kunert et al. | |
| 2014/0310302 A1 | 10/2014 | Wu et al. | |

OTHER PUBLICATIONS

Tamara Yu, "Lincoln Laboratory Cyber Situational Awareness Pilot;" ARTS 2013 Poster; Published Feb. 26, 2013; 1 Page.

Office Action dated Sep. 29, 2015 corresponding to U.S. Appl. No. 14/157,174; 33 Pages.

Das et al., "Supporting Ontology-based Semantic Matching in RDBMS;" Proceedings of the 30$^{th}$ VLDB Conference in Toronto, Canada; 2004; 12 Pages.

Damodaran et al., "Knowledge Registry Systems and Methods;" Filed on Jan. 16, 2014 corresponding to U.S. Appl. No. 14/157,174; 36 Pages.

Ghazal et al., "BigBench: Towards an Industry Standard Benchmark for Big Data Analytics;" SIGMOD '13; Jun. 22-27, 2013; New York, New York; 12 Pages.

Hruschka Jr. et al., "Integrated Computing Technology;" Proceedings of the First International Conference, INTECH 2011; Sao Carlos, Brazil; May 31-Jun. 2, 2011; 183 Pages.

Gao, Jing, "Exploring the Power of Heterogeneous Information Sources;" Dissertation, Submitted to Graduate College of the University of Illinois at Urbana-Champaign; 2011; 194 Pages.

Sukumar et al., "Concept of Operations for Knowledge Discovery from "Big Data" Across Enterprise Data Warehouses;" 2013 Computational Sciences and Engineering Division; Oak Ridge National Laboratory, Oak Ridge, TN; 9 Pages.

Morshed et al., "Recommending Environmental Knowledge As Linked Open Data Cloud Using Semantic Machine Learning;" 2013 ICDE Workshops 2013; 2 Pages.

Dr. Tulinda Larsen, "Cross-Platform Aviation Analytics Using Big-Data Integration Methods;" 2013 Integrated Communications Navigation and Surveillance (ICNS) Conference; Apr. 25, 2013; 20 Pages.

Dr. Tulinda Laresen, "Cross-Platform Aviation Analytics Using Big-Data Methods;" masFlight; Bethesda, MD; 2013; 9 Pages.

U.S. Notice of Allowance dated Apr. 12, 2016 corresponding to U.S. Appl. No. 14/157,174; 12 Pages.

* cited by examiner

METHOD AND SYSTEMS FOR ENHANCED ONTOLOGY ASSISTED QUERYING OF DATA STORES

CROSS REFERENCE TO RELATED APPLICATION

This application is a continuation-in-part of co-pending U.S. application Ser. No. 14/157,174 filed Jan. 16, 2014, which application is incorporated herein by reference in its entirety.

STATEMENT REGARDING FEDERALLY SPONSORED RESEARCH

This invention was made with Government support under Grant No. FA8721-05-C-0002 awarded by the U.S. Air Force. The Government has certain rights in the invention.

BACKGROUND

As is known in the art, many organizations, including private and public businesses as well as government agencies have a need to conduct real-time, ontology-based analysis of massive amounts of data collected from diverse sources. For example, a cyber security expert may be tasked with making sense of billions of network events generated by millions of unique users. Such data may be logged by many different network proxies, web servers, Dynamic Host Configuration Protocol (DHCP) servers, and user authentication systems, each having a different log format.

As is also known, modern unstructured key/value stores (i.e. so-called "Big Data" databases) are well suited to storing massive amounts from diverse data sources.

Key/value stores are generally more flexible compared to traditional databases (e.g. SQL databases) because they generally do not impose a schema or other constraints on the data stored therein. A single table within a key/value can store data from multiple data sources that use disparate naming conventions and data formats. Further, key/value stores generally provide better write/read performance and scalability compared with traditional databases.

SUMMARY

It has been appreciated herein that although unstructured key/value stores are well-suited for storing massive amounts of data from various data sources, it is difficult to perform high-level analysis on data stored therein.

In accordance with the concepts sought to be protected herein, a method for querying and retrieving data in a data store includes receiving a query from a user, the received query including an input address expression and an output address expression; providing an ontology associated with the received query, the ontology comprising a plurality of table entities corresponding to tables within the data store, each of the plurality of table entities having a plurality of field entities corresponding to columns within the data store; evaluating the input address expression using the ontology to resolve a table entity from the plurality of table entities and a duration; evaluating the output address expression using the ontology to resolve field entities of the table entity; generating a rewritten query using the resolved table entity, the resolved field entities, and the duration; executing the rewritten query over the data store to retrieve query result data; and returning the query result data to the user.

In some embodiments, generating the rewritten query comprises substituting the input and output address expressions within the received query. In various embodiments, executing the rewritten query over the data store comprises executing a Structured Query Language (SQL) query over a relational database. In certain embodiments, executing the rewritten query over the data source comprises executing an SQL query over a key/value store.

The method may further comprise retrieving one or more data collection records, each data collection record associated with the resolved table entity and comprising one or more database row identifiers, wherein generating a rewritten query comprises generating a rewritten query using the row identifiers. In some embodiments, the method also includes generating provenance information comprising the output address expression and information identifying the one or more data collection records, wherein returning the query results data to the user further comprises returning the provenance information.

In certain embodiments, the ontology further comprises dimension entities associated with the field entities. The input address expression may include a set of dimension entities, wherein evaluating the input address expression using the ontology to resolve a table entity from the plurality of table entities comprises locating a table entity from the plurality of table entities have field entities associated with all of the set of dimension entities. The input address expression may include a dimension entity, wherein evaluating the input address expression using the ontology to resolve a table entity from the plurality of table entities comprises locating a table entity from the plurality of table entities having a field entity associated with the dimension entity of the input address expression.

In some embodiments, the ontology further comprises dimension set entities and data operator entities, each dimension set entity having a set of the plurality of dimension entities, ones of the dimension set entities reachable by other ones of the dimension set entities through ones of the data operator entities. The input address expression may include a dimension set entity, wherein evaluating the input address expression using the ontology to resolve a table entity from the plurality of table entities comprises determining ones of the dimension sets reachable by dimension set entity of the input address expression.

In various embodiments, the ontology further comprises tag entities, each of the tag entities associated with one or more of the field entities. The input address expression may include a tag entity, wherein evaluating the input address expression using the ontology to resolve a table entity from the plurality of table entities comprises locating a table entity from the plurality of table entities having a field entity associated with the tag entity of the input address expression.

Also in accordance with the concepts sought to be protected herein, a system for querying and retrieving data in a data store comprises an analytics platform to receive a query from a user, the received query including an input address expression and an output address expression; a knowledge registry comprising an ontology; an address expression query processor; and a query executor to execute the rewritten query over the data store to retrieve query result data. The address expression query processor is configured to evaluate the input address expression using the ontology to resolve a table entity and a duration, the table entity corresponding to a table within the data store, and to generate a rewritten query using the table entity, the field entities, and the duration. In some embodiments, the data store is a key/value store. In various embodiments, data store is a relational database and the rewritten query comprises a Structured Query Language (SQL) query. In some embodiments, the data store is a key/value store and the rewritten query comprises an SQL query.

BRIEF DESCRIPTION OF THE DRAWINGS

Various embodiments of the systems and methods sought to be protected herein may be more fully understood from the following detailed description of the drawings, in which.

DETAILED DESCRIPTION

Figure 1:
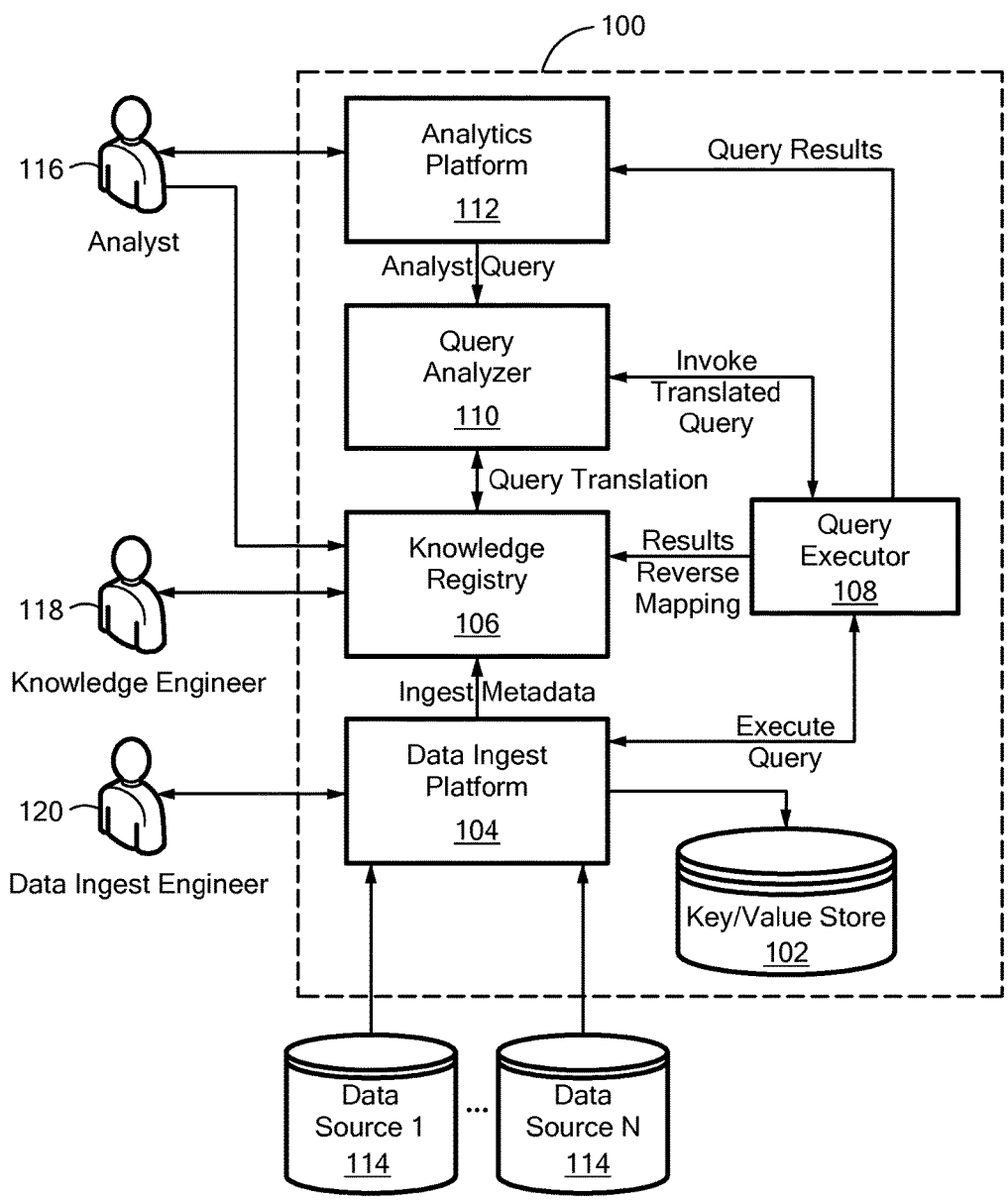
FIG. 1 is a block diagram of an exemplary analytics system that includes a knowledge registry.

Before describing exemplary embodiments of the systems and methods used to teach the broad concepts sought to be protected herein, some introductory concepts and terminology used in conjunction with the exemplary embodiments are explained. As used herein, the terms "data record" and "record" are used to describe a set of attributes, each attribute having a value and a corresponding identifier (sometimes referred to as the attribute "name"). The terms "data record collection" and "data collection" are used to describe a group of one or more related data records. As used herein, the term "soft deleted" refers to a data record stored within a system that is hidden from the system users but is not physically deleted from the system.

The term "analyst" is used herein to refer to any person or system capable of using the analytics systems and methods described herein to obtain high-level analytics information, including but not limited to humans and intelligent machines (e.g. machines having neural-network capability). The term "engineer" is used herein to refer to any person or system capable of configuring, maintaining, or operating the systems described herein.

The term "dimension" is used to describe a normalized, opaque data type for use within the present systems and methods. The term "dimension set" is used herein to describe a group of related dimensions. In one respect, dimensions and dimension sets are entities included within an ontology (i.e. ontology entities"). For example, in the cyber security domain, an ontology may include the dimensions "IPAddress", "DomainName", and "Time", each of which is included within the dimension set "WebRequest."

Dimensions and/or dimensions sets can be qualified using tags, as described below. Examples of qualified dimensions include "Client:IPAddress" and "Server:DomainName."

Reference will sometimes be made herein to the Knowledge Query Language (KQL) and KQL queries. KQL is an ontology-based, domain-specific, structured query language designed for use in the present systems and methods.

In general, a KQL query includes a dimension set ("DIMENSION_SET") and one or more operations ("OPERATIONS"), each operation including a query operator ("OPERATOR"), an input section ("INPUT"), and an output section ("OUTPUT"). The query operators are identifiers (e.g. strings) which correspond to opaque operations implemented by the systems described herein. Although the present systems are not limited to any specific KQL query operators, four operators are discussed herein for explanatory purposes, including SELECT, DISTINCT, COUNT, and DIFF, each of which is described further below in conjunction with TABLE 2.

The input and output sections can include a dimension identifier ("DIMENSION") and a corresponding constraint value ("VALUE"). The constraint value may include, but is not limited to, a scalar (e.g. "google.com"), a range (e.g. "201208110300,201208120300"), and/or commonly used relational operators (e.g. "<", ">", "=", "<=", ">="). For an input section, the dimension identifier specifies the type of data which the corresponding operator expects to receive as input. For an output section, the dimension identifier specifies the type of data that should be output by the corresponding operation. As a special case, the dimension identifier "ALL_DIMENSIONS" may be used within the output section to indicate all available dimensions should be included within the corresponding output result data. In one embodiment, the specified input and output dimension identifiers must be included within the specified identified dimension set.

An exemplary KQL query for use in cyber security applications is shown in TABLE 1 and will now be discussed. This query, which is shown encoded as JavaScript Object Notation (JSON), may be issued by an analyst to obtain a distinct collection of client IP addresses that have made web requests to a web server having the domain "google.com". It should be appreciated that KQL queries can be encoding using other suitable encoding techniques, including XML.

The query in TABLE 1 includes two operators having respective operator names "DISTINCT" and "SELECT". The operators are to be executed sequentially, in reverse order. The first operator ("SELECT") selects all available web request data in the given time period, where the corresponding web requested either originated from or was sent to a web server with a domain matching "google.com". The second operator ("DISTICT") computes the set of distinct IP addresses among the data returned by the first operator.

TABLE 1

{"OPERATIONS": [{"OPERATOR": "DISTINCT",
　　"INPUT": [{"DIMENSION": "Client:IPAddress"}],
　　"OUTPUT": [{"DIMENSION": "Client:IPAddress"}]},
　{"OPERATOR": "SELECT",
　"INPUT": [{"DIMENSION": "Server:DomainName",
　　"VALUE": "google.com"},
　{"DIMENSION": "Time",
　　"VALUE": "201208110300,201208120300"}],
　"OUTPUT": [{"DIMENSION": "ALL_DIMENSIONS"}]}],
"DIMENSION_SET": "WebRequest"}

Various exemplary embodiments are discussed hereinbelow making use of KQL. It is envisioned, however, that the broad concepts described herein are equally applicable to other query languages and that the concepts described herein are not limited to any particular query language.

FIG. 1 shows an exemplary analytics system 100, which includes: a key/value store 102, a data ingest platform 104, a knowledge registry 106, a query executor 108, a query analyzer 110, and an analytics platform 112. The analytics system 100 generally receives data from one or more data sources 114 and provides real-time, ontology-based query capabilities to an analyst 116. The data sources 114 can log files from a various third-party systems, including but not limited to network proxies, web servers, Dynamic Host Configuration Protocol (DHCP) servers, and user authentication systems. As will be apparent from the description that follows, the system 100 provides a complete layer of abstraction between the unstructured key/value store 102 and the analytics platform 112. Thus, the analyst 116 need not be concerned with the format or structure of the key/value store data, and can instead can focus on making sense of the that data.

Each of the system components 104-112 may include hardware and/or software components used to implement the respective functionality described hereinbelow. The components 104-112 may be coupled together as shown in FIG. 1. Each connection may be provided as a hardware-based connection, a software-based connection, or a connection provided from a combination of both hardware and software. Thus, it should be appreciated by those skilled in the art that the system 100 could be implemented entirely within a single computing device or distributed among a plurality of networked computing devices, the computing devices being either virtual machines or hardware-based devices. It should further be appreciated that the components 102-112 illustrated in FIG. 1 may also be coupled in configurations other than shown in FIG. 1. One of ordinary skill in the art, after the reading the disclosure provided herein will appreciate that a wide variety of different configurations may be used.

The data ingest platform 104 (also referred to herein as the "ingest platform") may be coupled to the data sources 114, the key/value store 102, the knowledge registry 106, and the query executor 108, as shown in exemplary embodiment of FIG. 1. In other embodiments, the query executor 108 and/or query analyzer 110 may be included within the ingest platform 104. A data ingest engineer 120 can manually operate the ingest platform 104 and/or configure the platform for generally autonomous operation.

In operation, the ingest platform 104 receives data from the plurality of data sources 114, groups the data into a collection of data records, stores the data records within the key/value store 102, and provides information about the collection to the knowledge registry 106. The key/value store 102 can be any unstructured storage facility capable of efficiently storing and retrieving massive amounts of data. Suitable off-the-shelf key/value stores include, but are not limited to, Apache Accumulo™, Apache HBase™, Apache Cassandra, other high performance data storage systems, such as Google Inc.'s BigTable database.

The ingest platform 104 includes a hardware or software component (referred to herein as a "database driver") configured to read and write to/from the key/value store 102. In one exemplary embodiment, the database driver is encapsulated in ingest platform 104 using a generic database interface and/or plugin system, thereby making it easy to change the key/value store implementation and allow multiple key/value stores 102 to be used simultaneously within the ingest platform.

As is known in the art, several unstructured key/value stores (e.g. Apache Cassandra) utilize an architecture wherein data is organized by "tables", "rows", and "columns". A table includes an arbitrary number of rows indexed by a "row key". Row keys are arbitrary fixed-length values chosen by a user. Several such databases, including Apache Accumulo™ as one example, store rows in lexicographical order by key and, therefore, allow range queries to efficiently retrieve multiple rows. A row includes an arbitrary number of columns indexed by a "column name". Typically, each column stores a single data value. Thus, each data value is located by a 3-tuple: a table, a row key, and a column name. It will be appreciated that such a database is particularly well-suited for storing and retrieving collections data records.

Thus, in some embodiments, the key/value store 102 utilizes an architecture that organizes data by tables, rows, and keys and has range query capabilities, and the data ingest platform 104 stores each ingested data record in a separate row. Further, the ingest platform 104 generates row keys such that all rows within a given data collection can be retrieved using a single range query. For time-oriented data (e.g. event data), the data ingest platform may group data records by time and include corresponding lexicographically-encoded timestamps.

In some embodiments, the ingest platform 104 includes one or more syntactic analysis processors or modules which execute one or more parsing techniques ("parsers") to parse one or more different input data formats, such as comma-separated (CSV) or tab-delimited formats widely used for log data. To facilitate the use of many diverse data sources, the ingest platform 104 may include a plug-in system, wherein several different parsers can be supported simultaneously and new parsers can easily be added to the platform. The data ingest engineer 120 can configure an appropriate parser to be used for each of the data sources 114.

As discuss above, the ingest platform 104 may group the (parsed) data records into collections. In some embodiments, each collection generally has the same number of records. In one exemplary embodiment, this fixed size may be configured by the data ingest engineer. In other embodiments, wherein the received data includes log data, the number of records in each collection corresponds to the number of lines in a log file, and thus collection sizes vary. In yet other embodiments, the ingest platform 104 groups time-oriented data records based on a specified time period, such as every minute, every 10 minutes, or every hour. The data ingest platform may allow these time periods (referred to as a "buffer period" hereinbelow) to be configured for each data source and the ingest platform 104 can use the buffer period configurations to perform automatic, period data ingestion. In one exemplary embodiment, the data ingest engineer may configure the time periods via the data ingest platform 104.

Those skilled in the art will appreciate that the size of a data record collection presents certain tradeoffs to the system performance. For example, smaller collection sizes can be processed more quickly, thus providing more real-time insight to the analyst 116. In embodiments, the ingest platform 104 includes a streaming mode wherein data is ingested into the key/value store 102 as soon as it becomes available and thus collections may contain as few as one data record. On the other hand, larger collections, processed less frequently, allow for certain processing and space-wise efficiencies in the system 100.

Various filtering/processing capabilities may be added to the data ingest platform 104. For example, to reduce the volume of data stored in the key/value store 102, the ingest platform 104 may filter or aggregate duplicate or similar data records. As another example, the ingest platform may normalize data before storing in the key/value store, such as converting IP address from a non-standard format to the standard dotted quad form.

After storing a collection of data records into the key/value store 102, the ingest platform 104 provides information about the newly ingested data collection to the knowledge registry 106. Thereby, the knowledge registry 106 is notified that new data is available and, in turn, the new data is accessible the analyst 116. In one exemplary embodiment, the information is provided as metadata; the metadata may include substantially the same attributes as a data collection record 332 used within the knowledge registry 106 and discussed below in conjunction with FIG. 3.

The knowledge registry 106 may be coupled to the ingest platform 104, query executor 108, and query analyzer 110, as shown. Further, the knowledge registry 106 may receive input from, and provide output to a knowledge engineer 118. To reduce data transfer times, the knowledge registry 106 may be implemented as part of the ingest platform 104. The structure and operation of the knowledge registry 106 is discussed in detail below in conjunction with FIG. 2.

The analytics platform 112 may be coupled to the query executor 108 and the query analyzer 110. The analytics platform 112 may include a plurality of applications (e.g. information visualization applications), some of which include a user interface (UI) for use by the analyst 116. The query analyzer 110 may be coupled to the knowledge registry 106, the query executor 108, and the analytics platform 112, as shown. In embodiments, the query analyzer 110 may be part of the analytics platform 112.

In operation, the query analyzer 110 generally receives KQL queries from the analytics platform 112, utilizes the knowledge registry's data store state access service 206 (FIG. 2) to translate query ontology entities into key/value store identifiers (e.g. row keys, column names, and secondary indexes), and issues appropriate communications ("calls") to the query executor 108.

Another function of the query analyzer 110 is to improve (and ideally optimize) query execution times and required processing power compared to execution times and required processing power without such improvements/optimizations. In one embodiment, the knowledge registry 106 tracks which columns have secondary indexes and the query analyzer 110 automatically applies these secondary indexes, when available. In another embodiment, the query analyzer 110 may consult the knowledge registry's usage history service 208 to determine which queries have historically resulted in relatively slow execution and, thus, should be avoided. As another optimization, the query analyzer 110 heuristically reduces (and ideally minimizes) query execution time by selecting a query with a relatively few (and ideally, the fewest) number of operators. As yet another optimization the query analyzer 110 can determine if any data is available for a given time range (e.g. the value specified with a "Time" dimension); if no data is available, the query analyzer 110 can return an empty/null response to the user and not waste system resources (e.g. processing power) invoking the query executor 108. Such "feasibility" or "executability" queries may be performed implicitly, as a form of optimization by the query analyzer 110, or issued explicitly by an analyst 116.

In the exemplary embodiment of FIG. 1, the query executor 108 is coupled to the data ingest platform 104, knowledge registry 106, query analyzer 110, and analytics platform 112. In some embodiments, the query executor 108 may be part of the data ingest platform 104. In alternate embodiments, the query executor 108 is directly coupled to the key/value store 102 and, therefore, may include one or more components (e.g. hardware, software, or a combination of hardware and software) needed to communicate with the key/value store 102. For example, the query executor 108 may include one or more of the database drivers discussed above in conjunction with the ingest platform 104.

The query executor 108 performs two primary functions. First, the query executor 108 is the only system component which is directly coupled to the key/value store 102 to execute database operation thereon (although, in some embodiments, the data ingest platform 104 may write data collections into the data store 102). Thus, it is possible to add, remove, and change the key/value store implementation without requiring any change to the knowledge registry 106, the query analyzer 110, or the analytics platform 112. Second, the query executor 108 provides a query operator application programming interface (API) for use by the query analyzer 110. In one embodiment, the operator-based API includes a separate call for each query operator, such as the operators shown below in TABLE 2. This separation of concerns enables the query analyzer 110 to focus on analyzing and optimizing user queries, while the query executor 108 can focus on providing improved (and ideally optimized) implementations of the various query operators based upon the underlying database storage structure.

If a particular operator is implemented within the key/value store 102, the query executor 108 may delegate some/all of the work thereto. The other operators can be implemented directly within the query executor 108 (i.e. the query executor 108 can post-process data retrieved from the key/value store 102). For example, if the key/value store 102 includes a native count function, the query executor 108 may implement the "COUNT" operator API call merely by delegating to the key/value store. Of course, the "SELECT" operator API call will be delegated to an appropriate key/value store query function. However, if the key/value store 102 does not include a native unique/distinct function, the query executor 108 must include a suitable processor-based implementation of that function. In some embodiments, one or more of the operators is implemented within the data ingest platform 104 and the query executor 108 delegates corresponding API calls thereto.

TABLE 2

| Operator | Inputs | Output |
|---|---|---|
| SELECT | Range of row keys<br>Zero or more value constraints<br>One or more column names | Collection of data records, each record satisfying the value constraints and having the specified column names |
| DISTINCT | One column name<br>Collection of data records | Filtered collection of data records having only one record for each value of the specified column name |
| COUNT | Grouping specifier (e.g. time or column values)<br>Collection of data records | Histogram based on grouping specifier. If time is used, various bin sizes can be used (e.g. hourly, daily, weekly) |
| DIFF | Two histograms resulting, each resulting from a COUNT operator | Difference in the two histograms over the corresponding two time ranges |

After executing the requested operation, the query executor 108 returns a resulting data collection (the "results") to the query analyzer 110 or directly to the analytics platform 112. Before doing so, the query executor 108 may perform a "reverse mapping" whereby the results are converted from native key/value store column names and data types to the corresponding query dimension names and data types. As discussed below in conjunction with FIG. 3, the knowledge registry 300 may associate a data type with each ontology dimension 312 and/or field 324, and, therefore, the query executor 108 can retrieve this information (via the data store state access service 200) to convert from native data types to normalized ontology-based data types.

In a particular embodiment, executing a query may require retrieving data from multiple key/value stores. Here, the CIM may include information regarding how to access one or more key value stores (referred to hereinbelow as "data store access information"), such as an IP address, a network port, and a database name for each key/value store. Further, the CIM may associate each data collection (ingested by the data ingest platform 104) with one more key/value store. During query processing, the query executor 108 can use the data store access information to retrieve data from the respective stores and combine ("join") the results data as needed using any suitable techniques known in the art, including any "join" techniques common used in relational databases.

It should be appreciated that various analytics system components 104-112 of the can be combined and/or further partitioned and therefore the system shown in FIG. 1 is merely one exemplary embodiment.

Figure 2:
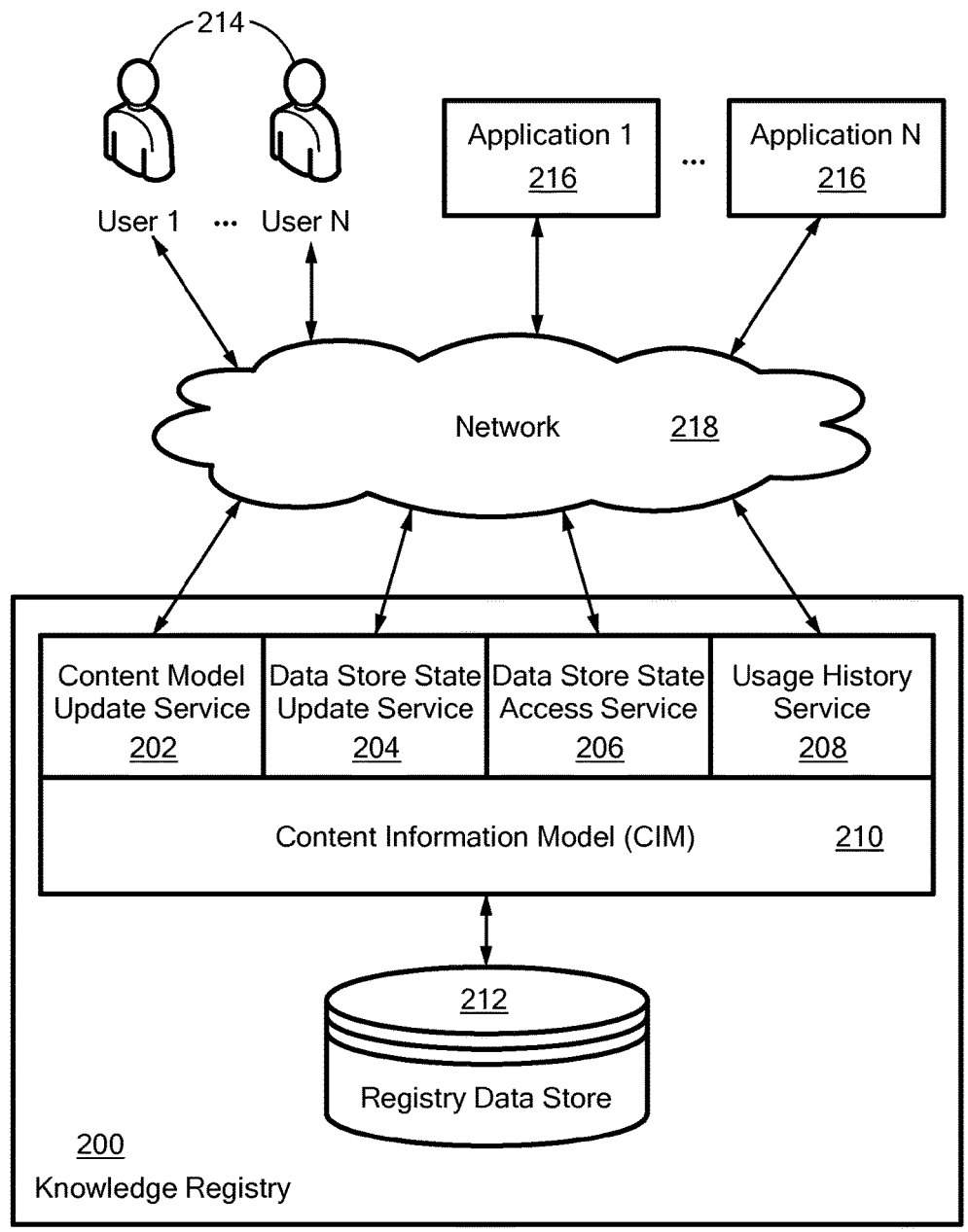
FIG. 2 is a block diagram of an exemplary knowledge registry for use within the analytics system of FIG. 1.

Referring now to FIG. 2, an exemplary knowledge registry 200 may be the same as or similar to the knowledge registry 106 in FIG. 1. The knowledge registry 200 includes a Content Information Model (CIM) update service 202, a data store state update service 204, a data store state access service 206, a usage history service 208, a CIM 210, and a registry data store 212. A plurality of users 214 and/or applications 216 may access the various services 202-208 via a network 218, which may be a local-area network (LAN), wide-area network (WAN) such as the Internet, or any other suitable type of computer network. The applications 216 may include a data ingest platform 104, a query executor 108, a query analyzer 110, and/or an analytics platform 112 (FIG. 1). The users 214 may include an analyst 116, a knowledge engineer 118, and/or a data ingest engineer 120 (FIG. 1), any of whom may interact with the knowledge registry 200 directly via the network 218, or indirectly via one of the applications 216.

Those skilled in the art will appreciate that the knowledge registry 200 can be implemented and deployed using a variety of software, hardware, and network architectures. In one embodiment, the knowledge registry 200 is a monolithic software application that implements the several services 202-208, the CIM 210, and the registry data store 212. In another embodiment, the registry data store 212 is a stand-alone database management system. In yet another embodiment, each of the services is a separate software application, coupled to the CIM 210 and the registry data store 212. Further, multiple instances of the knowledge registry 200 may execute concurrently on one or more physical/virtual computing environments. In one embodiment, the services 202-208 include Web Service APIs, responsive to one or more request/response content-types, such as JSON and XML. The services 202-208 may include access controls, user authentication, and/or a data encryption.

Although the operation of the knowledge registry services 202-208 will be discussed further below in conjunction with FIG. 5, a brief overview is now given. The content model update service 202 is generally used by the knowledge engineer 118 (FIG. 1) to update the ontology information stored within the registry data store 212. The data store state update service 204 is used by the data ingest platform 104 to update data collection metadata stored within the registry data store 212. The data store state access service 206 is used by the query analyzer 110 to determine the location and availability of data requested by the analyst 116. The data store state access service 206 may also be used by the query executor 108 to perform a "reverse mapping", as discussed further below. The usage history service 208 is used by the query analyzer 110 to retrieve historical query execution timing information, which is also stored within the registry data store 212. The usage history 208 is also used by the query analyzer 110 and/or query executor 108 to store new query execution timing information.

Figure 3:
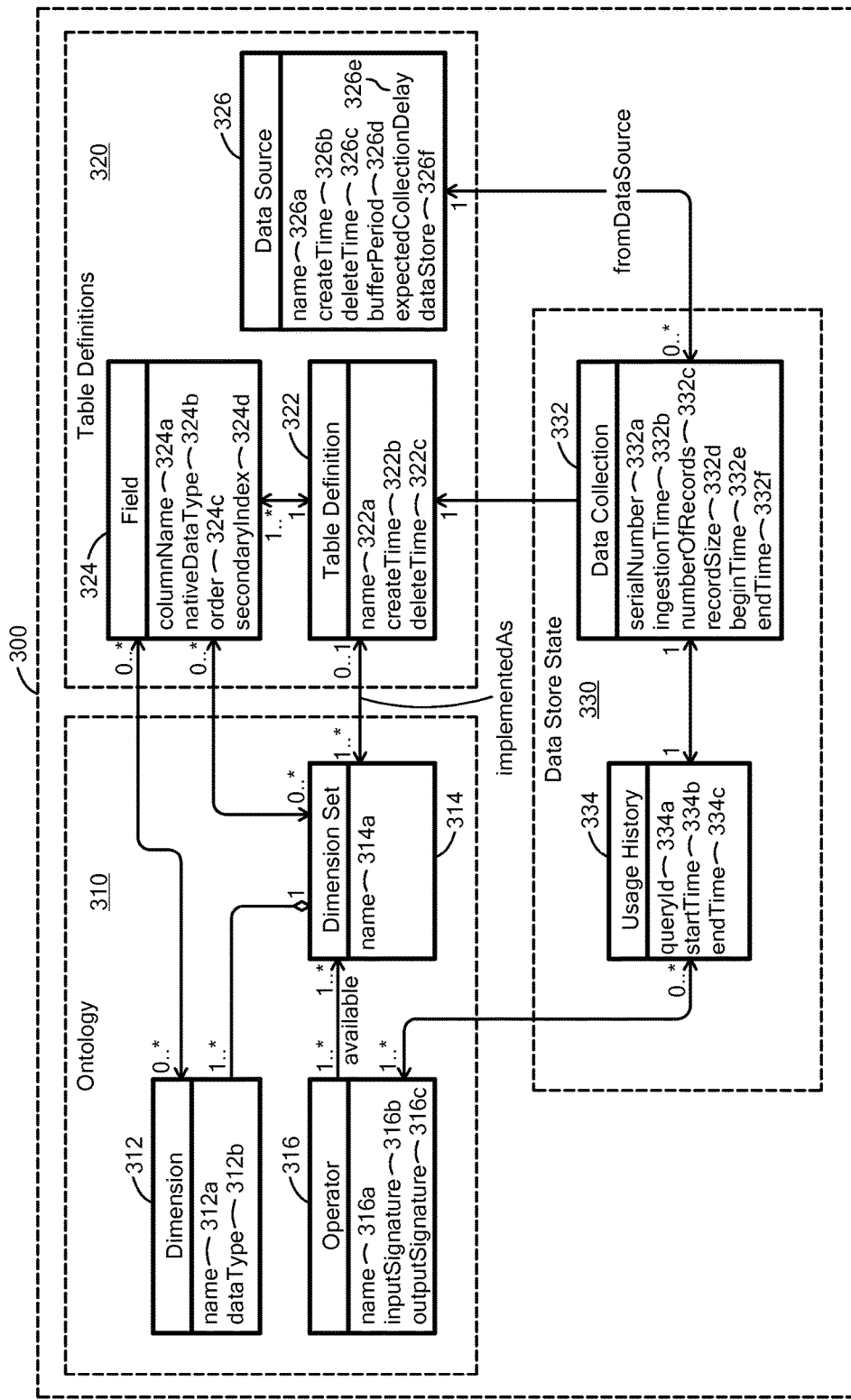
FIG. 3 is a diagram of an exemplary Content Information Model (CIM) for use within the knowledge registry of FIG. 2.

The CIM 210 is a data model which describes a mapping between one or more ontologies and data stored in key/value store 210. The CIM 210 comprises executable code, configuration data, and/or user data which may be included within the various services 202-208 and/or stored within the registry data store 212. For example, the CIM 210 includes a schema (such as shown in FIG. 3) used within the registry data store 212 and software modules which encapsulates the various schema entities to provide a record-based API to the knowledge registry services 202-208. As another example, the ontology portion 310 (FIG. 3) of the CIM may be described using an ontology language, such as the Web Ontology Language (OWL), stored within the registry data store 212. A detailed description of an exemplary CIM is presented below in conjunction with FIG. 3.

The registry data store 212 stores various information used by the services 202-208. The store 212 may include, or be coupled to, a non-volatile memory, such as a solid-state disk (SSD) or a magnetic hard disk (HD). In one embodiment, the registry data store 212 includes a relational database management system (RDBMS), such as MySQL. In another embodiment, the registry data store 212 is an unstructured data store and, therefore, may be included with the key/value store 102. The registry data store 212 can be widely distributed or can be at a single location in a single database.

FIG. 3 shows a Unified Modeling Language (UML)-style class diagram of an exemplary CIM 300, which may be the same as or similar to CIM 210 in FIG. 2. For convenience of explanation, the exemplary CIM 300 will be discussed hereinbelow with reference to three discrete portions: an ontology portion 310, a table definitions portion 320, and a data store state portion 330. Each portion includes one or more "entities" (typified by entity 312) which are abstract data models that may be realized as database tables, one or more data rows/records within a database, and/or one or more software modules. As shown in FIG. 3, an entity may be in communication with or otherwise coupled ("associated") to one or more other entities.

The ontology portion 310 describes one or more ontologies used within the knowledge registry 200 (FIG. 2). Thus, the ontology portion 310 determines how knowledge is represented within the knowledge registry 200. The ontology portion 310 can be domain-specific; that is, the data model entities therein may vary based upon the type of data that is stored in the key/value store 102 and the corresponding ontologies. In particular, entities that describe domain-specific knowledge concepts may be added to the CIM 300 and, therefore, it should be appreciated that the exemplary ontology portion 310 shown in FIG. 3 is merely a generalized, baseline data model which can be readily extended.

The exemplary ontology portion 310 includes one or more dimensions 312, one or more dimension sets 314, and one or more operators 316. A dimension 312 includes a name 312a and a data type 312b. The name 312a is an arbitrary ontological identifier provided by the knowledge engineer 118, such as "IPAddress" or "Time". The data type 312b indicates a normalized data type and format in which corresponding result data is encoded. The data type 312b may be a C-style format string, an enumerated value, or any other suitable identifier. As discussed further below, the dimension data types 312b and field data type 324b may be collectively used by the query executor 108 to map native data types/formats to normalized ontology data types/formats.

In some embodiments, a dimension 312 may be comprised of one or more other dimensions (i.e. dimensions may bay be associated with other dimensions). For example, in the cyber security domain, the knowledge engineer 118 may generate a "URL" dimension (referring to Uniform Resource Locators) that is comprised of an "IPAddress" dimension and a "Port" dimension. Such decomposition capability allows the knowledge engineer 118 to map a complex ontology entity to multiple "low level" columns in the key/value store.

A dimension set 314 represents a grouping of related ontology entities and, thus, includes one or more dimensions 312. Dimensions are generally unordered within a dimension set; in contrast, fields are generally ordered within a table definition, as discussed below. Dimension sets 314 include a name 314a (e.g. "WebRequest") which may be provided by the knowledge engineer 118. Dimension names 312a and/or dimension set names 314a may be unique within the knowledge registry, allowing them to be used as primary identifiers. In some embodiments, a dimension set 314 is associated with one or more operators 316 such that the knowledge registry services can determine which operators are available for a given dimension set. The specific dimensions 312 and dimension sets 314 available within the knowledge registry are configured by the knowledge engineer 118, via the content model update service 202.

It should be known that the meaning of the various dimension sets 314 relates to the specific ontology being modeled within the CIM 300. For example, if event data is being modeled (i.e. the ontology is an event-based ontology), each configured dimension set 314 may represent a different event type. Thus, in such a domain-specific embodiment, a "dimension set" may be referred to as an "event type" or the like.

An operator 316 includes a name 316a, an input signature 316b, and an output signature 316c, the combination of which may be unique within the knowledge registry 200. Example operator names 316a are shown above in TABLE 2. An operator 316 represents either an opaque operation to retrieve a data collection (e.g. "SELECT") or an opaque transformation on a data collection. Accordingly, the input signature 316b and the output signature 316c specify the ontology entities expected to appear in the input collections and output collections, respectively (for retrieval operations, the "input" collection corresponds to the data retrieved from the key/value store). It should be appreciated that the signatures 316b, 316c can be readily constructed based on the "INPUT" and "OUTPUT" sections of a KQL query. In some embodiments, the ontology portion 310 of the CIM may be provided by the knowledge engineer 118 (via the content model update service 202) using OWL.

The table definitions portion 320 represents a mapping between an ontology used within knowledge registry and one or more table structures within the key/value store 102. The exemplary table definitions portion 320 shown in FIG. 3 includes one or more table definitions 322, one or more fields 324, and one or more data sources 325. A data source 326 represents one or more of the data sources 114 (FIG. 1) from which the key/value store 102 is populated. A data source 326 includes a name 326a, a create timestamp 326b that indicates the date-time when the data source was added to the knowledge registry, and a delete timestamp that indicates the date-time the data source was soft deleted from the knowledge registry. The data source names 326a may be unique with the knowledge registry 200. A data source 326 may include additional attributes used by the data ingest platform 104 to perform automatic, period data ingestion such as a buffer period 326d and an expected collection delay 326e. A table definition 322 includes a unique name 322a, a create timestamp 322b indicating when the definition was added to the knowledge registry, and a delete timestamp 322c indicating when the definition was "soft" deleted (i.e. removed) from the knowledge registry. Data sources 326 may be generated, updated, and soft deleted by the data ingest engineer 120 via the data ingest platform 104, which uses the knowledge registry's data store state update service 204. The data ingest engineer 120 provides a unique name 326a and other required attributes.

In some embodiments, a data source 326 further includes data store access information 326f. In one embodiment, the data store access information comprises an IP address, a network port, and a database name and is used to configure a database driver within the query executor 108 and/or data ingest platform 104.

A table definition 324 includes one or more fields 324, each of which includes a column name 324a that corresponds to a column name within the key/value store 102. A table definition 322 may be associated with one or more dimension sets 314 such that the knowledge registry services 202-208 (FIG. 2) can determine which table definitions implement a given dimension set. In addition, one or more of the fields 324 may be associated with an ontology entity (i.e. a dimension 312 or a dimension set 314) such that, given a list of ontology entities, the services 202-208 can determine the names of columns within the key/value store that contain relevant data. As discussed above, a dimension 312 may comprise other dimensions, and thus may be associated with a plurality of fields 324; in other words, a discrete ontology entity may span multiple key/value store columns.

In some embodiments, a field 324 further includes a native data type which indicates the type and/or format of data stored within the corresponding key/value store columns. The native data type 324b can be used by the query executor 108 (FIG. 1) to "reverse map" a data collection retrieved from the key/value store 102 from a native type/format to a normalized ontological data type/format associated with the ontology.

A field 324 may further include an order value 324c, which is used by the data ingest platform 104 to interpret ordered data from a given data source. In some embodiments, a data source 326 may also be associated with a table definition 322 and, therefore, using the field ordering, may periodically, automatically receive data from the data source 114 and populate the key/value store 102 therewith.

In a particular embodiment, a field 324 further includes secondary index information 324d. In one embodiment, the secondary index information 324d is a simple flag (i.e. boolean value) that indicates whether the key/value store 102 includes a secondary index on the corresponding column. In other embodiments, the secondary index information 324d may be a string which indicates the name of the index, and the information may be used by the query executor 108 to construct an appropriate key/value store query. In most embodiments, the query analyzer 110 and/or query executor 108 uses the secondary index information 324d to generate queries which take less time and/or power to execute.

It should now be appreciated that, in one aspect, the table definitions portion 320 of the CIM, in association with the ontology portion 310 of the CIM, defines a mapping between a knowledge-based ontology and an unstructured data store. Moreover, a table definition 322 and associated fields 324 define how data is stored within the key/value store 102, thus imparting a "meta structure" onto unstructured data stores.

Table definitions 322, fields 324, and their associations with the ontology portion 310 may be assigned by a knowledge engineer 118 via the data ingest platform 104, which uses one or more of the knowledge registry service, and stored in the registry data store 212.

The data store state portion 330 of the CIM represents the contents of the key/value store 102; that is, it tracks which data presently exists in the key/value store 102 and can be used to answer queries from an analyst. The data store state portion 330 may include one or more data collection records 332, each of which represents a collection of data records ingested from a data source 114 into the key/value store 102. As discussed above, in some embodiments, an ingested data collection is stored as a plurality of rows within the key/value store 102. A data collection record 332 may include a serial number 322a which uniquely identifies the collection with the knowledge registry 200, an ingestion timestamp 322b that indicates the time the data was ingested into the key/value store 102, the number of records 322c in the collection, and the size of each record 322d. A data collection also includes one or more attributes to locate the corresponding data records (i.e. rows) within the key/value store, for example a begin timestamp 322e and an end timestamp 322f, which can be used by the data ingest platform 104 to generate the start/end keys for a range of rows. A data collection record 332 is associated with a table definition 322, thereby allowing the knowledge registry services 202-208 to locate rows within the key/value store that contain data corresponding to a given ontology entities. For reference purposes, a data collection record 332 may also be associated with a data source 326.

The data store state portion 330 may also include one or more usage history records 334, each of which corresponds to a query executed by an analyst 112. In one embodiment, a usage history record 334 tracks operations performed by the query executor 108 (FIG. 1), and thus may be associated with an operator 316, as shown. A usage history record 334 may include a query identifier 334a, a start timestamp 334b indicating the time the query execution started, an end timestamp 334c indicating the time the query execution completed. The query executor 108 may generate usage history records 334—via the usage history service 208—when a operation is completed. As discussed above, a KQL query may result in multiple operations, and thus to track the overall execution time of a KQL query, a common query identifier 334a can be used across several usage history records 334.

It should now be appreciated that the knowledge registry 200, in particular the services 202-208 and the CIM 210, are entirely isolated from the key/value store 102, and therefore the database structure used within the key/value store 102 can be changed independently of the data models used within the knowledge registry 200, and vice-versa. More specifically, dimensions 312, dimension sets 314, and operators 316 are implementation independent such that the data ingest platform 104 has the freedom to store data in the key/value store 102 using any structure it chooses so long as the mappings are stored in the knowledge registry 106.

Figure 4:
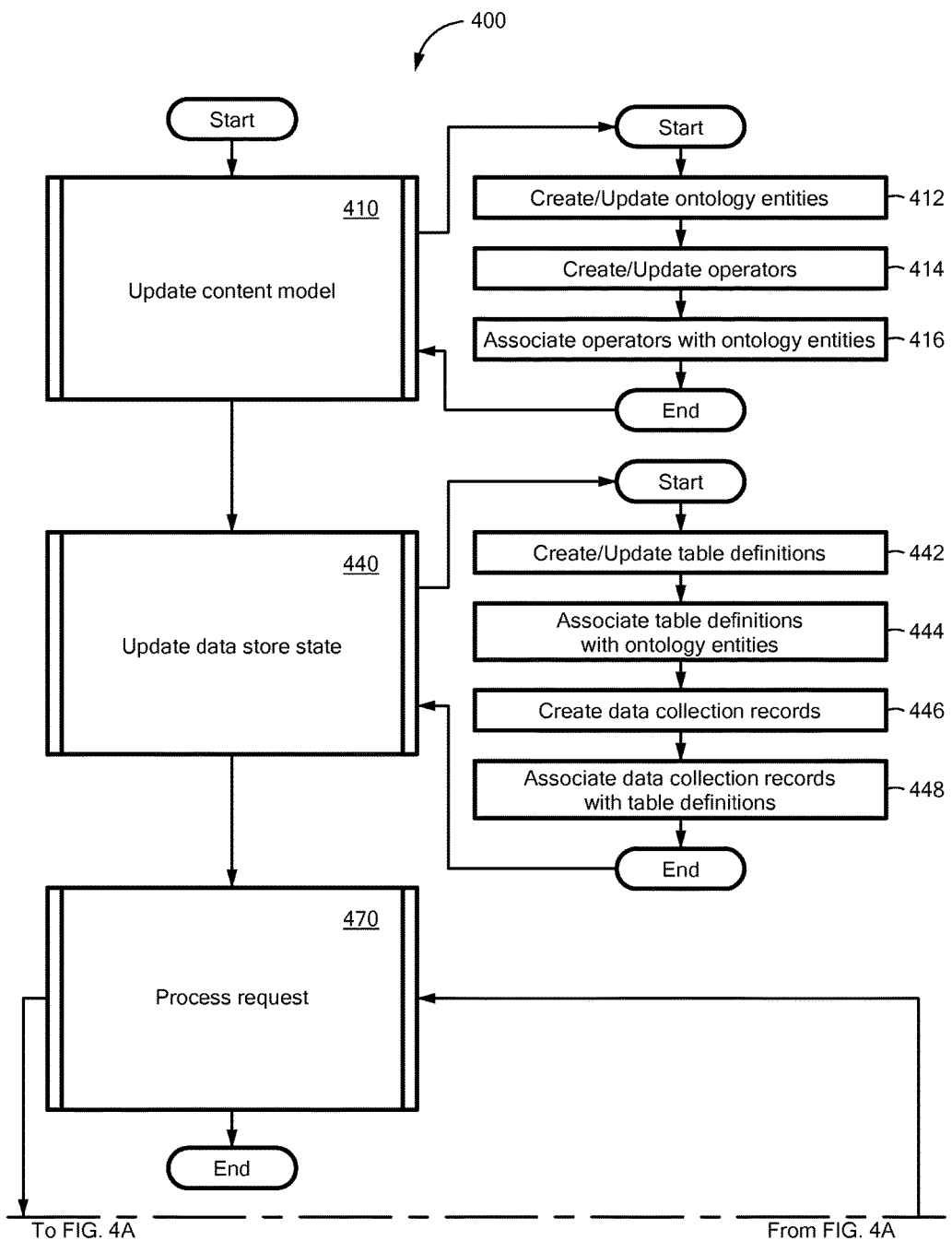
FIGS. 4 and 4A are a flowchart showing an exemplary method for use within the knowledge registry of FIG. 2.
Figure 4A:
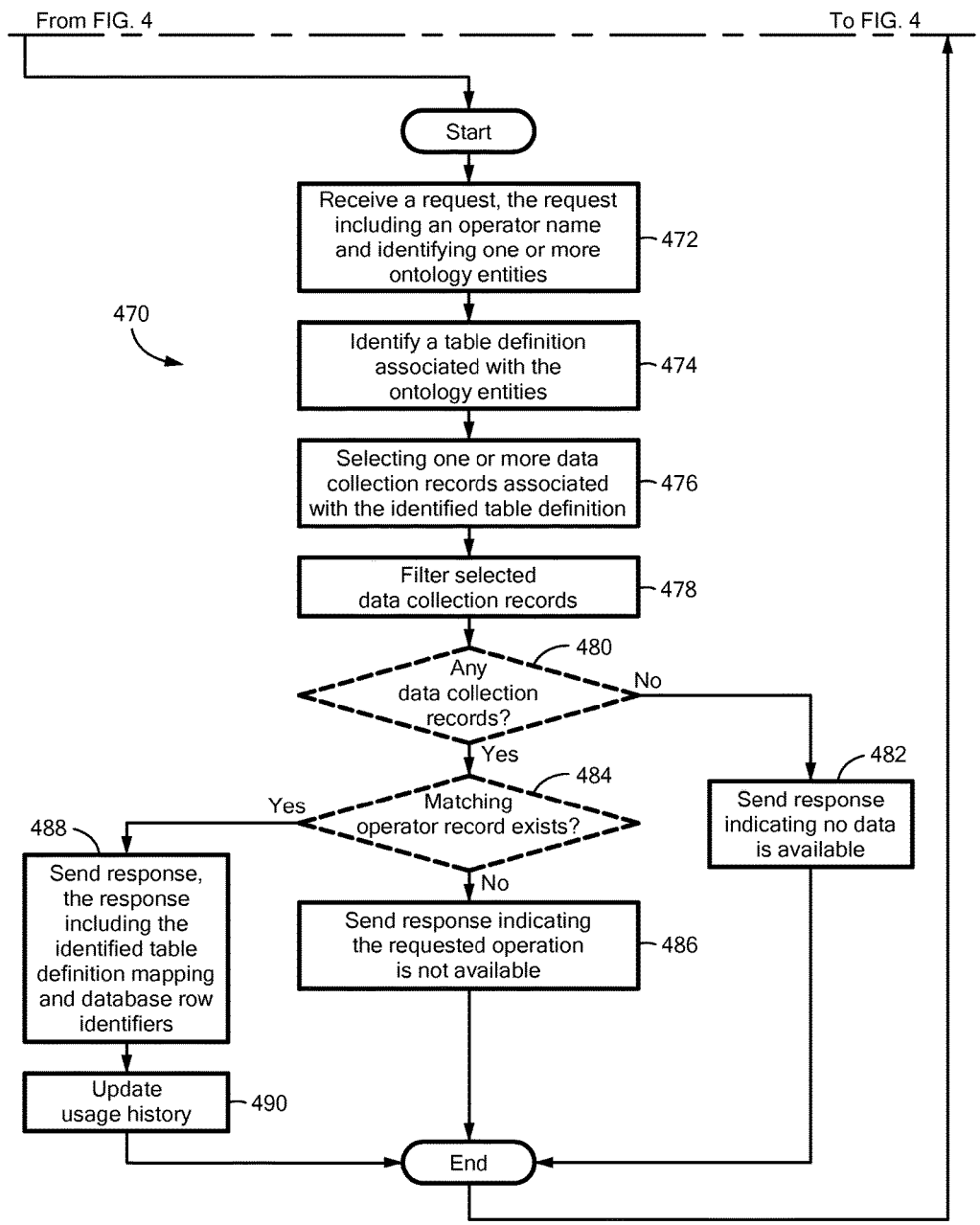

Referring now to FIGS. 4 and 4A, an exemplary method 400 for use in a knowledge registry, such as knowledge registry 200 (FIG. 2), is shown. The method 400 comprises three sub-methods: updating the content model 410, updating data store state 440, and processing a query 470.

Figure 5:
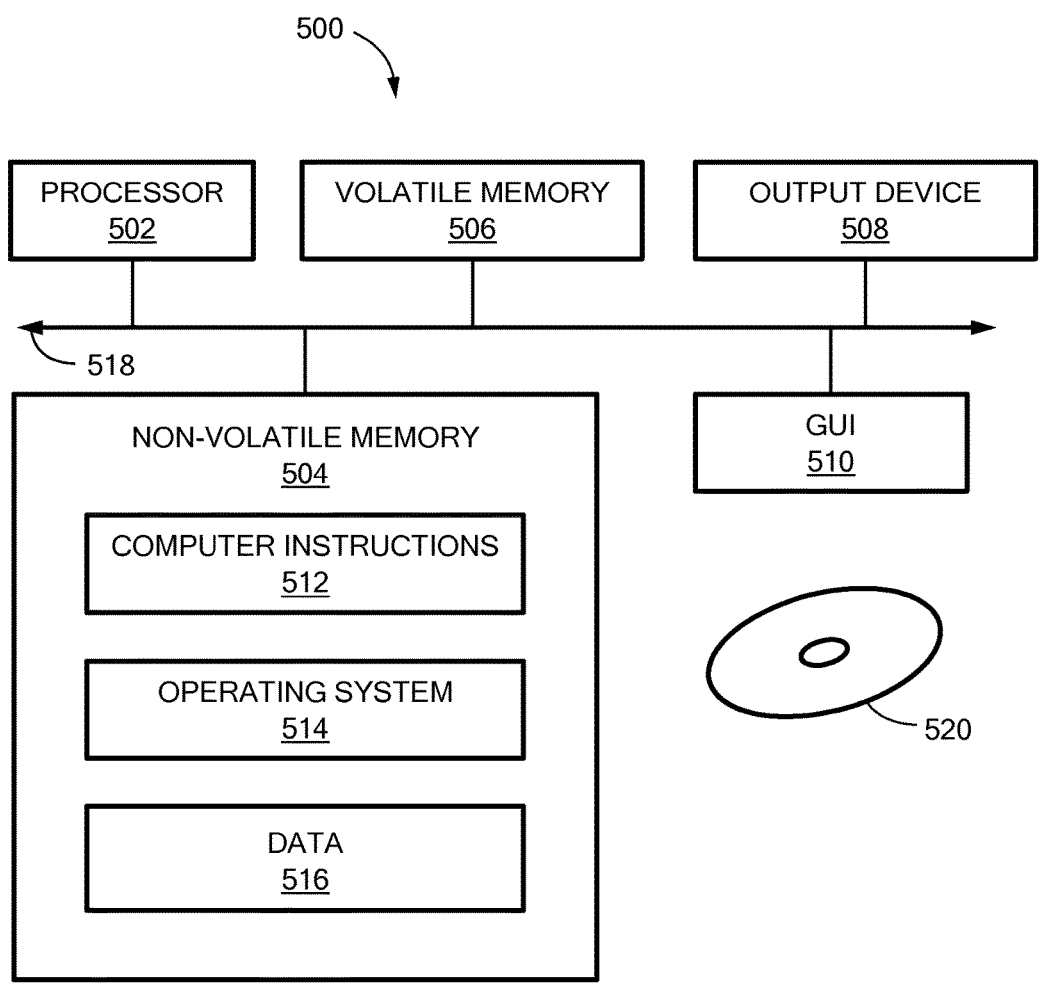
FIG. 5 is a schematic representation of an exemplary computer for use with the systems of FIGS. 1 and 2.

It should be appreciated that FIGS. 4 and 4A show a flowchart corresponding to the below contemplated technique which may be implemented in a computer system 500 (FIG. 5). Rectangular elements (typified by element 412), herein denoted "processing blocks," represent computer software instructions or groups of instructions. Rectangular elements having double vertical lines (typified by element 410), herein denoted "sub-methods," represent a logical and/or physical grouping of processing blocks. Diamond shaped elements (typified by element 478), herein denoted "decision blocks," represent computer software instructions, or groups of instructions, which affect the execution of the computer software instructions represented by the processing blocks. Alternatively, the processing blocks, sub-methods, and decision blocks represent steps performed by functionally equivalent circuits such as a digital signal processor circuit or an application specific integrated circuit (ASIC). The flowchart does not depict the syntax of any particular programming language, but rather illustrates the functional information one of ordinary skill in the art requires to fabricate circuits or to generate computer software to perform the processing required of the particular apparatus. It should be noted that many routine program elements, such as initialization of loops and variables and the use of temporary variables are not shown.

It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the steps can be performed in any convenient or desirable order. In particular, the sub-methods 410, 440, 470 can be executed in any order and one or more sub-method may be executed in parallel; an ordered, serial method is shown in FIG. 5 merely for convenience of explanation.

In general, the exemplary sub-method 410 generates and/or updates certain portions of the CIM 210 within the knowledge registry 200. More specifically, the sub-method 410 generates dimension 312, dimension set 314, and/or operator 316 records within the registry data store 212 and/or updates existing such records. The sub-method 410 may be implemented within the content model update service 202, used by a knowledge engineer 118.

The sub-method 410 begins at block 412, where one or more ontology entities (i.e. dimensions 312 or dimension sets 314) are generated/updated. Next, at block 414, one or more operators 316 are generated/updated. Finally, at block 416, the generated/updated ontology entities are associated with one or more operators and, similarly, the generated/updated operators are associated with one or more ontology entities; the nature of these associations is discussed further above in conjunction with FIG. 3.

The exemplary sub-method 440 generates/updates table definition 322, field 324, data source 326, and data collection records 332 within CIM 210. The sub-method 440 may be implemented within the data store state update service 204, used by a data ingest engineer 120.

The sub-method 440 begins at block 442, where one or more table definitions 322 records are generated/updated. If a column is added to the key/value store, block 442 includes generating one or more associated fields 324. If a column is removed from the key/value store, block 442 includes deleting/disassociating one or more fields 324.

Next, at block 444, one or more table definitions (typically the table definitions generated/updated in processing block 442) are mapped to ontology entities 312, 314 as follows. First, each table definition 322 is associated to a dimension set 312, indicating that the associated data collections—and corresponding rows—comprise data related to the dimension set ontology. Second, one or more of the fields 324 within the table definition is associated to a dimension 312, indicating that the corresponding column name stores data having that dimension.

At processing block 446, one or more data collection record 332 is generated within the registry data store 212, indicating that new data has been ingested into the key/value store 102. In the final block 448 of exemplary sub-method 440, each of the newly generated data collection records 332 is associated with a table definition 322.

It should now be appreciated that processing blocks 442 and 444 generate a mapping between a table definition and an ontology, and the processing blocks 446 and 448 associate the table definition to one or more identified rows within the key/value store 212. Typically, the blocks 446 and 448 will be repeated more frequently compared to the blocks 442 and 444.

The exemplary sub-method 470 (FIG. 4A) processes an ontology-based query, such as a KQL query. The sub-method 470 may be implemented within the data store state access service 206 (FIG. 2), used by an analyst 116 via an analytics platform 112 (FIG. 1) and/or a query analyzer 110. The sub-method 470 begins at block 472, where a query is received, the query having an operator name and identifying one or more ontology entities. In an embodiment, the query ontology entities includes an operator name, a dimension set identifier, one or more input dimension identifiers, and one or more output dimension identifiers. Here, the query may correspond to a single operator from a KQL query. Using the exemplary KQL query from TABLE 1, the data store state access service 206 may receive an ontology-based query having the dimension set identifier "WebRequest", the operator name "SELECT", input dimensions "Server:DomainName" and "Time", and output dimension "ALL_DIMENSIONS".

The query analyzer 110 may receive a full KQL query from an analyst 116 and iterate over the operations therein, invoking the sub-method 470 once for each such operation.

Next, at block 474, at least one table definition 322 is identified based upon the received query. In one embodiment, where the query includes a dimension set identifier, the data store state access service 206 first retrieves a dimension set 314 based upon the query dimension set identifier and then finds a table definition 322 associated with the identified dimensions set 314. As discussed above, the table definition 322—and associated fields 324—defines a mapping between column names used in the key/value store 102 and one or more ontology entities.

Next, at block 476, one or more data collection records 330 are selected. In one embodiment, all data collection records 330 associated with the identified table definition 322 are selected.

Next, at block 478, the selected data collection records may be filtered. In some embodiments, the key/value store includes event data and one or more of the data collection records includes a range of event times. Herein, the selected data collection records may be filtered based on a time range included with the query (e.g. the "Time" value constraint shown in TABLE 1); data collection records 330 that have a begin timestamp 332e or an end timestamp 332f outside the time range are excluded. For example, referring back to the query in TABLE 1, only events which occurred on or after 2012-08-11 03:00:00 UTC and on or before 2012-08-12 03:00:00 UTC are selected (in TABLE 1, the time zone UTC is implied).

Next, decision block 480 may be performed. If all of the data collection records are excluded by the filtering, a response is sent (at block 482) indicating that no data is available to satisfy the query. Such a "feasibility" check is provided for efficiency, allowing the system 100 (FIG. 1) to avoid unnecessary, expensive database queries. If any data collection records remain, the sub-method 470 continues as follows.

In embodiments where the received query includes an operator name, decision block 484 may be performed next. Herein, it is determined whether an operator 316 exists having a name 316a matching the query operator name. If no such operator 316 exists, a response is sent (at block 486) indicating that the requested operation is not available.

Otherwise, at block 488, a response is sent which includes the identified table definition column mapping and row identifiers, which are based upon the selected data collection records. In one embodiment, the row identifiers comprise one or more time ranges (i.e. a begin timestamp and an end timestamp) corresponding to the time ranges in the selected data collection records; overlapping and contiguous time ranges may be combined to reduce the size of the response.

Finally, at block 490, a usage history record 334 may be stored and associated with the operator matched in block 484.

FIG. 5 shows an exemplary computer 500 that can perform at least part of the processing described herein. The computer 500 includes a processor 502, a volatile memory 504, a non-volatile memory 506 (e.g., hard disk), an output device 508 and a graphical user interface (GUI) 510 (e.g., a mouse, a keyboard, a display, for example). The non-volatile memory 506 stores computer instructions 512, an operating system 514, and data 516, each of which is coupled together by a bus 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Figure 6:
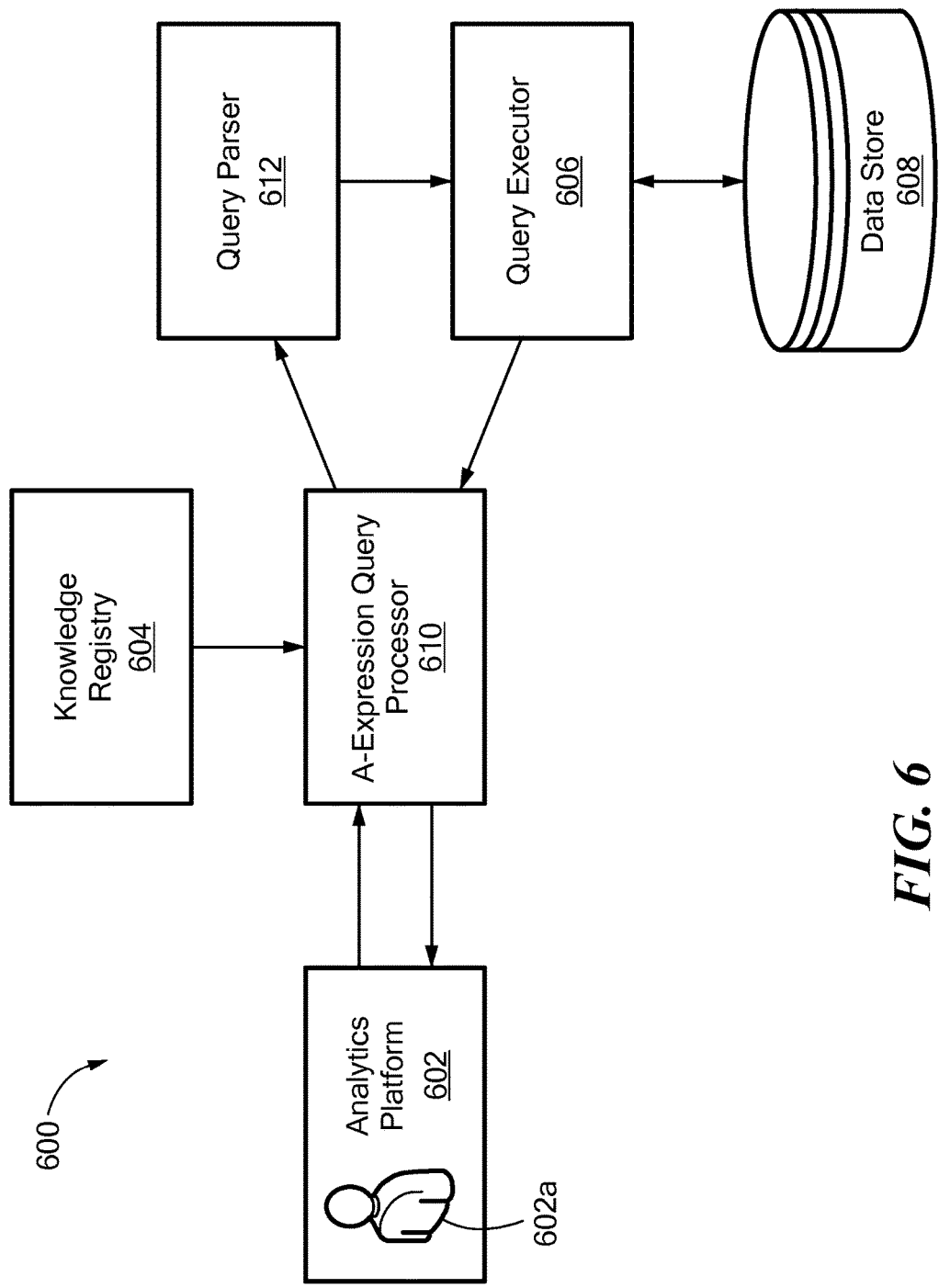
FIG. 6 is a block diagram of an illustrative analytics system for processing implementation-independent queries, which may include address expressions ("A-Expressions")

Referring to FIG. 6, an analytics system 600 for processing implementation-independent queries includes an analytics platform 602, a knowledge registry 604, a query executor 606, and a data store 608, which may be the same as or similar to the analytics platform 112, the knowledge registry 106, the query executor 108, and the key/value store 102, respectively, of FIG. 1. The system 600 further includes an A-Expression query processor (AQP) 610 and a query parser 612, which, taken together, may be the same as or similar to the query analyzer 110 of FIG. 1.

The term "implementation-independent query" is used herein to refer to any type of query that does not directly refer to a data store's structure or format. More specifically, an implementation-independent query generally does not include table names, column names, row keys, or other identifiers used within the data store 608. Implementation-independent queries can be described in any suitable query language, including KQL (previously described) or SQL. In certain embodiments, implementation independence is provided by embedding implementation-independent specifications (referred to herein as "address expressions" or "A-Expressions") that can be resolved to data store identifiers using an ontology.

Figure 7:
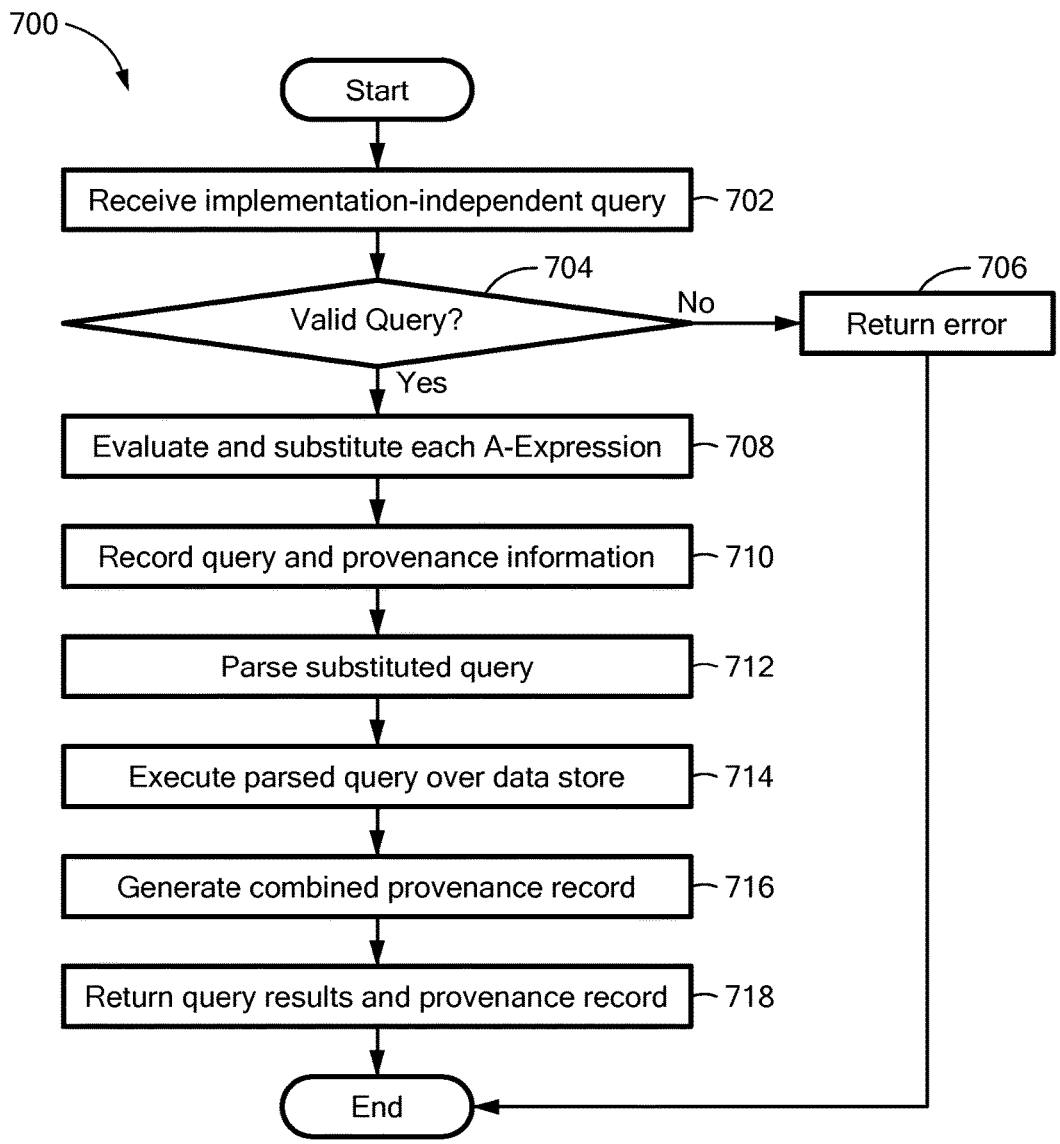
FIG. 7 is a flowchart of an illustrative method for use with the analytics system of FIG. 6.

FIG. 7 shows an illustrative method 700 that may correspond to processing performed by the system 600 (FIG. 6) when processing an implementation-independent query. At block 702, the implementation-independent query is received; the query may be submitted by a user 602a (e.g., an analyst) via the analytics platform 602 and may contain embedded A-Expressions. At block 704, the AQP 610 checks each of the A-Expressions in the query for syntactic and semantic validity. If, at block 706, the submitted query is invalid, an appropriate error is returned to the user 602a via the analytics platform 602. Otherwise, processing continues at block 708, where the AQP 610 uses ontological information within the knowledge registry 604 to evaluate each A-Expressions to resolve data store identifiers (e.g., table names, column names, and/or row keys). The AQP 610 rewrites the submitted query by substituting the A-Expressions with the resolved data store identifiers to generate a "rewritten query", which is passed to the query parser 612.

In some embodiments, at block 710, the AQP 610 records provenance and context information regarding the query and returns this information to the user 602 via the analytics platform 602 along with query results. Such provenance information may include the tables, fields, and/or data collections used for evaluating the A-Expression queries. A more complete discussion of record provenance information is presented below, following the description of A-Expressions.

In certain embodiments, the AQP 610 applies one or more techniques to improve (and ideally optimize) query execution times and required processing power compared to execution times and required processing power without such improvements. Examples of such techniques are described above in conjunction with the query analyzer 110 of FIG. 1, including resolving secondary indexes when possible, avoiding historically slow data store operations, and making a feasibility/excitability determination to avoid unnecessary data store operations.

At block 712, the query parser 612 parses the rewritten query using any suitable parsing technique. For example, for queries expressed in SQL, a commercially available SQL parser could be used. As another example, KQL queries encoded using JSON can be parsed using any suitable JSON parser. At block 714, the query executor 606 executes the parsed query over the data store and the results are returned to the AQP 610, as shown in FIG. 6.

It should be understood that the query parser 612 and/or query executor 606 may be provided as part of a commercial off-the-shelf (COTS) database system. Alternatively, these components may be specifically designed for use in the analytics system 600. In one example, the data store 608 corresponds to a relational database and the query is expressed in SQL. Thus, the query parser 612 and query executor 606 may be provided within a COTS relational database management system (RDBMS) capable of receiving, parsing, and executing a SQL query. In another example, the data store 608 corresponds to a key/value store and the query executor is configured to implement one or more data operators (e.g., the operators shown in TABLE 2) over the key/value store. In this case, the query parser 612 inspects the rewritten query and issues appropriate communications ("calls") to the query executor. If the query is expressed in SQL, a mapping may be performed between SQL operations and operations supported by the query executor 606.

In various embodiments, at block 716, the AQP 610 generates a provenance record for return to the user 602a. Since a query may have multiple output A-Expressions, the provenance record corresponding to the query result is based upon the aggregation of all provenance information for the individual output A-Expressions. At block 718, the query results and combined provenance record are made available to the user 602a via the analytics platform 602, e.g. by displaying or otherwise making the results available to the user.

Figure 8:
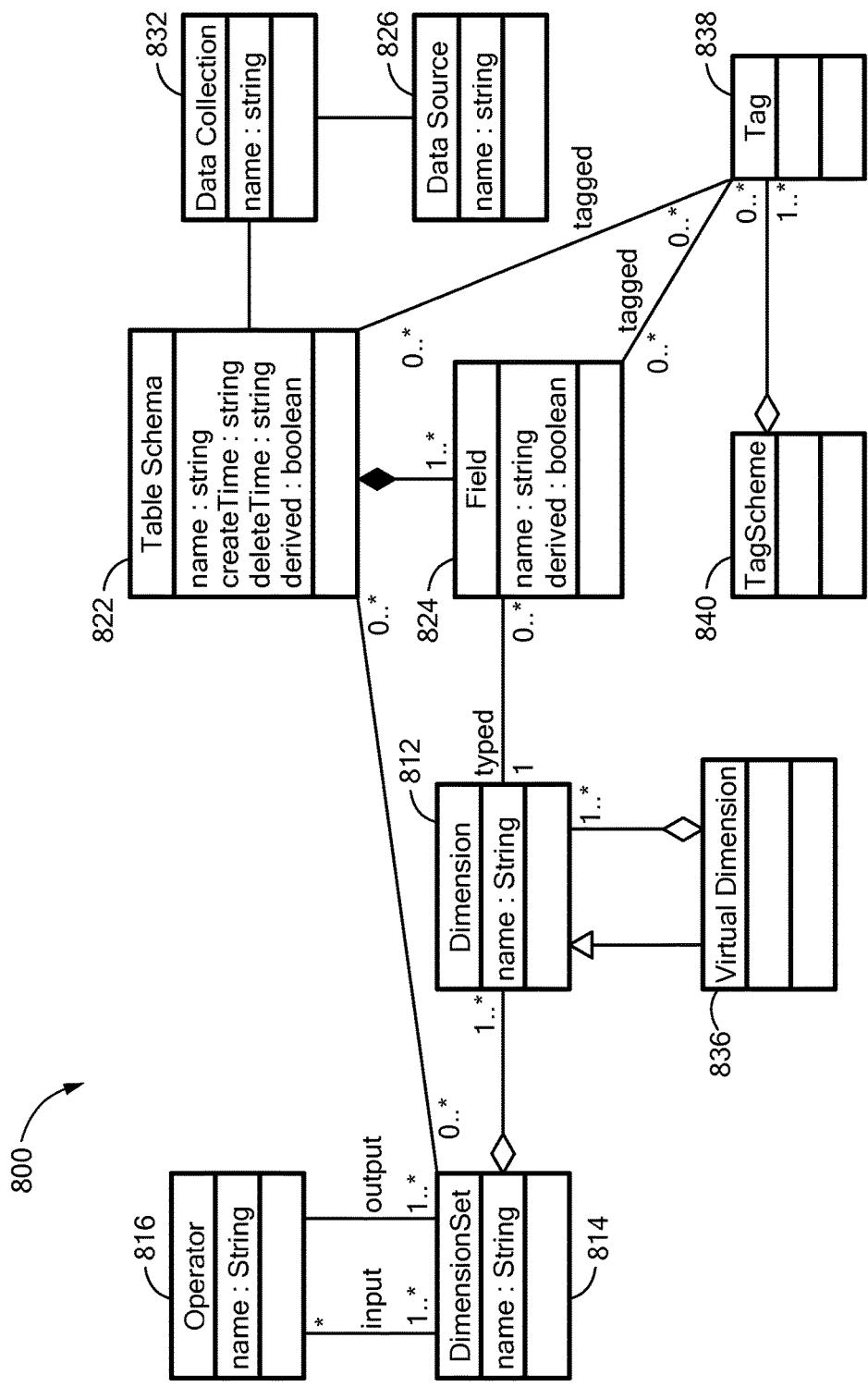
FIG. 8 is a diagram of an illustrative Content Information Model (CIM) for use within the analytics system of FIG. 6.

FIG. 8 shows another example of a Content Information Model (CIM) that could be used with a knowledge registry (e.g., the knowledge registry 604 of FIG. 6 and/or the knowledge registry 106 of FIG. 1). The illustrative CIM 800 includes the following entities, which are related to each other as shown in the figure: a dimension entity 812, a dimension set entity 814, an operator entity 816, a table schema entity 822, a field entity 824, a data source entity 826, a data collection entity 832, a tag entity 838, a tag scheme entity 840, and a virtual dimension entity 836.

The CIM 800 is similar to the CIM 300 of FIG. 3, however it includes additional ontology concepts to support A-Expression processing. For example, whereas the CIM 800 and CIM 300 both include a dimension, dimension set, operator, field, and table schema/definition entity, the CIM 800 further includes a tag, tag scheme, and virtual dimension entity. The ontology entities of particular relevance to A-Expressions are described below in detail. It should be understood that the CIM 800 can include other entities not shown in FIG. 8, such as a usage history entity 334 described above with FIG. 3. Moreover, the various entities shown in FIG. 8 can include any suitable attributes and the attributes shown are merely illustrative.

The table schema entity 822, in conjunction with the related field entity 824, represents a table structure within the analytics system 600. A table schema 822 may correspond to a table structure within the data store 608, or may be "derived" from such table structures using dimension sets 814 and data operators 816, as described below. A field 824 can be assigned a type and/or a specified syntactic format in which the stored information needs to be interpreted. This information is represented by the dimension entity 812 and can be used to interpret the content of a column within the data store 608. The mapping between field and dimension entities can be assigned by a user, more specifically by a Knowledge Engineer. The analytics system 600 may define a default dimension for fields. For example, in the case where the data store 608 is a key/value store, fields may default to a String-type dimension. If the data store 608 is a relational database, there may be additional default dimensions, such as an Integer-type dimension. Multiple fields from same or different tables may share the same Dimension.

Dimensions can be aggregated to another dimension referred to as a "virtual dimension" and represented by the virtual dimension entity 836. Such an aggregation may be the result of a requirement to assign a sequential order to a set of dimensions. The sequential ordering specified in a virtual dimension 836 is useful when parsing the contents of a new data source, and parts of the data source content may be interpreted as one or more dimension 812. Aggregation (or "virtualization") of a dimension may also occur due to reinterpretation of the content of a field into additional dimensions at a later time. A given dimension 812 may be part of multiple different virtual dimensions 836. In some embodiments, the knowledge registry 608 requires that all fields corresponding to dimensions in a virtual dimension must be in the same table.

It may also be useful to group together dimensions without implying any sequential ordering. This need is supported by the concept of a "dimension set" and represented by the dimension set entity 814. Dimension sets need not correspond to any existing table. Dimensions in a dimension set need not correspond to dimensions of any existing fields in a table, although it may be convenient to do so in the early stages of a development of a knowledge registry for a data store. Instead of making dimension sets map to the existing fields in tables, knowledge engineers can specify "abstract" sets of dimensions that would make sense from the point of view of analysts who specifies queries within a specific domain. The interpretation of a dimension set can be domain-specific. For example, in an event-based domain, dimension sets may be interpreted as "events," with "WebRequest" being an example event. It should be noted that a dimension set 814 could include not only dimensions 812, but also virtual dimensions 836.

Those skilled in the art will understand that tags are a widely used as a means of categorizing and retrieving unstructured data. Personal tags allow categorizing data in terms meaningful to a person. A tag is a keyword or qualifier assigned to a piece of information. A Tag is a kind of metadata that helps describe an item and allows it to be found again by browsing, searching, or querying. Tags are generally chosen informally and personally by the item's creator or by its viewer, depending on the system. A given data item may be assigned multiple tags and a specific user may know of only a subset of these tags and a specific user may know of only a subset of these tags. Tags may be organized into sets (referred to herein as "tag schemes"), which can be created by individual users and shared with others. Tags within a tag scheme may have relationships among them, or no relationships. Equivalence relationships may be defined between individual tags, whether or not they belong to a common tag scheme.

Accordingly, the CIM 800 provides a tag entity 838 and a related tag scheme entity 840. A field 824 or a table schema 822 can be assigned tags from one or more tag schemes, as shown. In some embodiments, tags that are not assigned to a tag scheme are assumed to belong to a default tag scheme having special A-Expression syntax, as described below. A particular field or table may be associated with multiple tags from the same or different tag schemes. A tag scheme 840 can include an arbitrary number of tags 838, which need not be related.

A dimension set 814 can also be represented as a function of one or more dimension sets and a data operator that operates on the specified dimension sets and/or scalar values. A dimension set that exists due to an operation on another dimension set is said to be "derived from" the other dimension; a dimension set 814 can be derived from multiple dimensions sets. Within the CIM 800, derived dimension sets are represented using the operator entity 816 having specified input and output dimension sets used to infer the "derived from" relationship between dimension sets through the specified data operator. As discussed further below, a derived dimension set is semantically equivalent to a non-derived dimension set, and is treated as such in A-Expressions. In one aspect, the operator entity 816 represents a mapping between various dimension sets within an ontology. Such a mapping can be used to implement a "reachability" operator within A-Expressions, as described further below in conjunction with FIG. 9.

A derived dimension set 814 can be associated with a table schema 822 and associated fields 824; such table/field entities do not directly correspond to columns within the data store 608. It may be useful to distinguish between non-derived (i.e., "actual") tables/fields and derived tables/fields. Thus, in some embodiments, the table schema 822 and field 824 entities include a "derived" flag, as shown in FIG. 8.

Figure 9:
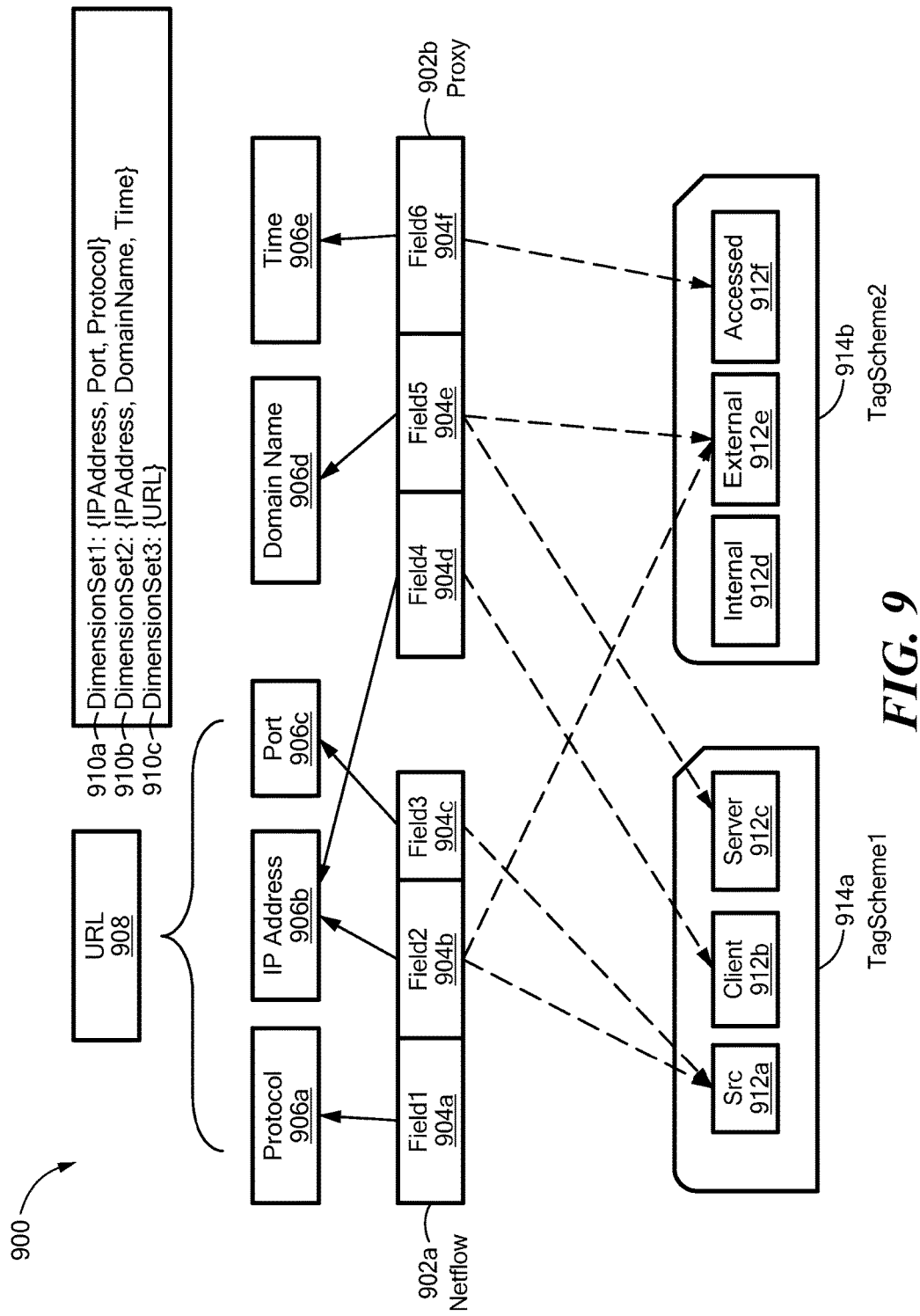
FIG. 9 is a diagram of an illustrative ontology that could be defined within the analytics system of FIG. 6.

FIG. 9 shows an illustrative ontology 900 which could be defined within a knowledge registry using the CIM 800 of FIG. 8. The ontology 900 includes a Netflow table 902a and a Proxy table 902b, which would correspond to table structures within a data store (e.g., data store 608 of FIG. 6). The Netflow table 902a includes three fields 904a, 904b, and 904c which are mapped to a Protocol dimension 906a, an IPAddress dimension 906b, and a Port dimension 906c, respectively. The Proxy table 902b includes three fields 904d, 904e, and 904f which are mapped to the IPAddress dimension 906b, a DomainName dimension 906d, and a Time dimension 906e, respectively. It will be appreciated that multiple fields from the same or different tables may share the same dimension. For example, Field2 904b in the Netflow table and Field4 904d in the Proxy table are both associated with the IPAddress dimension 906b.

A URL virtual dimension 908 aggregates the Protocol 906a, IPAddress 906b, and Port 906c dimensions, and defines a sequential order among them. In this particular example, the URL virtual dimension 908 is effectively an alias for the Netflow table 902a. However, whereas the Netflow table 902a includes un-typed data and arbitrary field names (e.g., "Field 1," "Field 2," etc.), the virtual dimension 908 is defined in terms of higher-level dimensions 906a-906c.

The illustrative CIM 900 further includes three dimension sets: DimensionSet1 910a having the IPAddress 906b, Port 906c, and Protocol 906a dimensions; DimensionSet2 910b having the IPAddress 906b, DomainName 906d, and Time 906e dimensions; and DimensionSet3 910c having the URL virtual dimension 908. In contrast to virtual dimensions, the dimensions within a dimension set are unordered.

The CIM 900 also includes illustrative tags 912a-912f, which are grouped into two tag schemes: TagScheme1 914a having tags 912a-912c, and TagScheme2 914b having tags 912d-912f. Certain ones of the fields 904a-904f are mapped to various tags 912a-912f, as shown. Notably, a single field (e.g., field 904b) can have multiple tags and a single tag (e.g., tag 912a) can be associated with multiple fields.

Figure 10:
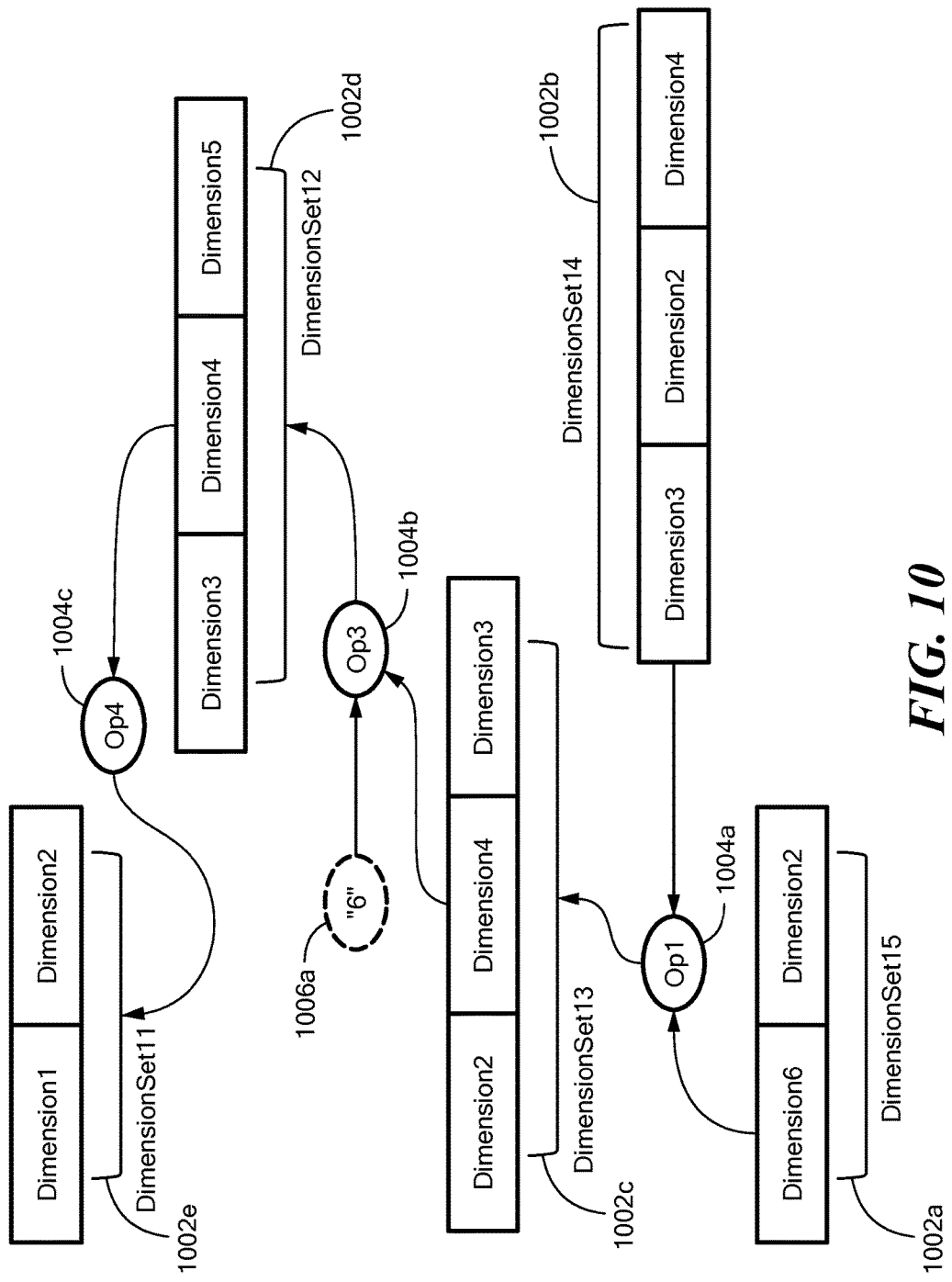
FIG. 10 is a diagram illustrating how data operators can be used to define a mapping between various dimension sets within an ontology.

FIG. 10 illustrates how data operators can be used to define a mapping between various dimension sets within an ontology. In this example, five dimension sets 1002a-1002e are related via three data operators 1004a-1004c, as shown. DimensionSet15 1002a and DimensionSet14 1004b correspond to actual tables/columns within the data store 608 (FIG. 6) and, thus, are said to be non-derived. DimensionSet13 1002c is derived from DimensionSet14 and DimensionSet15 through data operator 1004a, DimensionSet12 1002d is derived from DimensionSet13 through data operator 1004b, and DimensionSet11 1002e is derived from DimensionSet12 through data operator 1004c, as shown. Data operator 1004b uses a scalar value 1006a ("6") for processing.

As discussed above in conjunction with FIG. 6, a user 602a submits implementation-independent queries to the analytics system 600. Implementation independence can be achieved using embedded A-Expressions, which specify table and field (sometimes referred to as "columns") structures used within the data store in an implementation-independent manner. In general, an A-Expression does no contain any explicit reference to any table or field. A-Expressions embedded within a query can be evaluated using the knowledge registry 604. When evaluated over the data schema in a knowledge registry, an A-Expression yields a set of tables or fields. In general, any reference to a field or table within a query can be replaced by an A-Expression. Although this disclosure focuses on the use of A-Expressions to query key/value stores, those skilled in the art will understand that A-Expressions can be used over other types of data stores, such as relational databases.

An A-Expression may be constructed using the following ontological concepts: dimensions, dimension sets, tags, tag schemes, and a set operators. We refer to the operators used within A-Expresses as "registry operators" because they do not operate on data in the data store, but rather on the data schema or ontology stored in the knowledge registry 604. Various registry operators are contemplated and described in detail below.

A description of syntax for use within A-Expressions is described next. It should be understood that the syntax described is merely illustrative and that any suitable forms, literals, and other syntactic conventions could be used within the systems and methods sought to be protected herein.

The form "TagScheme:Tag" denotes a tag ("Tag") within a tag scheme ("TagScheme"), where the literal "_" denotes the default tag scheme. Similarly, the form "Table:Field" denotes a field ("Field") within a table ("Table"). Although table and field names generally do not appear directly within an A-Expression, this syntax will be used below for explanatory purposes. The literal "ALL" refers to all tables or all fields in the registry, depending on the registry operator context.

Below are the registry operators used in A-Expression:
1. "/" is a binary operator that takes as input tables and a dimension set, and returns the input tables that contain all dimensions within the dimension set.
2. "*" is a binary operator that takes as input tables/fields and dimensions/tags, and returns fields from the input tables/fields that match the dimensions/tags. For example, given the ontology of FIG. 9, the expression "ALL * IPAddress" would resolve to "Netflow:Field2" and "Proxy:Field4."
3. "." is a binary operator, referred to herein as the "duration operator," that takes as input fields and durations, and returns those fields that existed during any of the durations. The input durations are specified as a pair of date-time values within a pair of braces ("{" and "}"), separated using a comma (","). For example, referring to FIG. 9, the expression 'ALL/IPAddress.{"2013-05-30T09:00:00","2013-05-30T10:00:00"}*DimensionSet1' would resolve to "Netflow:Field2" if that field existed within the specified duration or, in some embodiments, if that field had corresponding data values within the specified duration.
4. "&" and "|" are the binary logical operators AND and OR, respectively, and "!" is the unary logical operator NOT.
5. Parentheses ("(" and ")") operate to impose an evaluation order: an A-Expression within a parenthesis will be evaluated prior to an A-Expression outside parenthesis.
6. Braces ("{" and "}") operate to specify a set of dimensions, dimension sets, or tag, wherein the set items are separated using a comma (",").
7. Brackets "[" and "]" operate to extract the set of dimensions from a set of dimension sets, where the group items are separated using a comma (","). For example, referring to FIG. 9, the expression "ALL/DimensionSet2 * (([DimensionSet2]) & (! (Time)))" would resolve to all fields in the Proxy table 902b except those with the Time dimension 906e (i.e., it would resolve to "Proxy:Field4" and "Proxy:Field5").
8. "?" is a unary operator, referred to herein as the "reachability operator," that takes as input a dimension set and returns the unique set of dimension sets reachable from the input dimension set through data operators. For example, regarding FIG. 10, the expression "DimensionSet13?" would resolve to {DimensionSet12, DimensionSet11}.

A virtual dimension is considered in A-Expressions just as a dimension of a field. As a consequence, the "sub-dimensions" of a virtual dimension will only resolve to fields that are within a single table, and these dimensions map to adjacent fields in the exact sequence in which the dimensions are defined in virtual dimension. For example, referring to FIG. 9, the expression "ALL * URL" would resolve to the fields of the Netflow table 902a, but not to fields of the Proxy table 902b.

A dimension set can be used in A-Expressions as a shortcut for specifying all its associated dimensions individually. A dimension set can be used to refer to tables having fields corresponding to the entire set of dimensions. For example, referring to FIG. 9, DimensionSet1 910a can be used to refer to Netflow table 902a and DimensionSet2 910b can be used to refer to Proxy table 902b. A dimension set can also be used to specify a particular field with a specific dimension. For example, referring again to FIG. 9, the expression "ALL/DimensionSet1*IPAddress" would resolve to "Netflow:Field3," and the expression "ALL/DimensionSet2*IPAddress" will resolve to "Proxy:Field4."

Anonymous dimension sets can be expressed using the registry operator. For example, the expression "ALL/{IPAddress, Port, Protocol}" is equivalent to "ALL/DimensionSet1" within the ontology of FIG. 9. The pair of brackets registry operator can be used to specify the dimensions in one or more dimension sets. For example, referring to FIG. 9, the expression "ALL * [DimensionSet1]" is equivalent to "ALL * {IPAddress, Port, Protocol}," and the expression "ALL * [DimensionSet1] * IPAddress" would resolve to "Netflow:Field2" and "Proxy:Field4." This operator may be of particular use when the name of a dimension set is known, but not the dimension within it.

Tags and tag schemes provide an alternate way to specify a subset of fields within an A-Expression. For example, referring to FIG. 9, the expression of "ALL * IPAddress" would resolve to both "Netflow:Field2" and "Proxy:Field4." Tags can be used to unambiguously specify one of those fields within an A-Expression.

Given the above description of A-Expression syntax and semantics, those skilled in the art will appreciate that A-Expressions can be combined in various ways to express complex relationships and construct fine-grained queries. For example, the "*" operator can be chained to narrow search results. Referring to FIG. 9, the A-Expression "ALL/DimensionSet1 * TagScheme1:Src * TagScheme2:External" would resolve to exactly "Netflow:Field3." As shown in this last example, multiple tag schemes can be used within a query. It is possible that TagScheme1 914a was created by a Knowledge Engineer, whereas TagScheme2 914b was created by an analyst based on their individual views of how information in the data store should be interpreted.

The logical operators can also be used to combine A-Expressions. For example, referring to the ontology of FIG. 9, the expression "ALL/IPAddress * (TagScheme1:Src & TagScheme2:External)" would resolve to "Netflow:Field2." Logical operators may be useful if the user does not know of certain dimensions or dimension sets, but does know of equivalent tags.

It is possible that a dimension set may resolve to multiple tables. In such cases, tags may be used to distinguish among the tables. For example, the expression "(ALL/DimensionSet1) & TagScheme1:someTag" could be used to identify only tables associated with "DimensionSet1" and "someTag."

Those skilled in the art could readily implement the registry operators using software and/or hardware. In a particular embodiments, each registry operator corresponds to a software routine or algorithm. An A-Expression syntax can be defined in terms of a grammar, which can be used by a commercially available parser generator to generate a parser (e.g., ANTLR, GNU Bison, etc.). The grammar may include the mapping between registry operators and their implementations so that the parser generator can invoke the implementations as needed to resolve expressions. Those skilled in the art can readily design and implement a parser with parsing rules based on the description provided herein.

A-Expressions can be used to determine the availability of data within a table. In some embodiments, the knowledge registry 604 maintains a list of available durations for each table and/or field therein. Alternatively, as shown in the CIM 300 of FIG. 3, the knowledge registry may use a beginTime and endTime with each ingested data collection associated with a table. Any such duration information can be used to implement the "." registry operator by selecting a subset of fields available within the given duration.

As discussed above, A-Expressions can be embedded in query languages, such as KQL (described above) or SQL. Within a query, an A-Expression can be categorized as an input A-Expressions or an output A-Expressions. An input A-Expression determines the set of data (i.e., fields, tables, and/or rows) from which the query results are taken, and an output A-Expression can select specific fields (or subsets of data from those fields) from that data set, as well as specify additional processing that should be performed on the data set using data operators.

In the context of a KQL query, input and output A-Expressions could be specified in the input ("INPUT") and output ("OUTPUT") sections, respectively, which are described above in conjunction with TABLE 1.

In the context of a SQL query, an input A-Expression may be derived from the "FROM" and "WHERE" clauses, whereas the output A-Expression may be derived from the "SELECT" clause. For example, considering the following SQL query:

SELECT {fqdn,ipv4}*_:dest FROM ALL/webwasher WHERE domain.{20131216060000,20131216065915} = "twitter.com".

From this, the analytics system can determine the input A-Expression
ALL/webwasher*domain.{20131216060000, 20131216065915}
and the output A-Expression
ALL/webwasher*{fqdn, ipv4}*_:dest
and generate the rewritten SQL query SELECT fqdn_f,ipv4_f FROM Domain_tbl WHERE domain_f="twitter.com"
AND Start_time >= 20131216060000 and End_Time <= 20131216065915, where fqdn_f, ipv4_f, domain_f, Start_time are columns with a table Domain_tbl in the data store.

Note that a "*" registry operator is inserted in the input A-Expression to create the A-Expressions after the content in the "FROM" clause, and before the content of the WHERE clause. Similarly, a "*" operator is inserted after the content in the "FROM" clause, and before the content of the SELECT clause ("{fqdn,ipv4}*_:dest"). If there are multiple clauses in the WHERE clause joined by SQL logical operators (AND/OR/NOT), then there will be as many input A-Expressions as there are separate A-Expression fragments in the WHERE clause. A similar approach may be used to embed A-Expressions in other SQL statements.

In the above example, the duration expression is mapped into the rewritten query as conditions on "Start_Time" and "End_Time" columns. This is merely one example of a database-specific implementation. Different databases implement time-based searching differently, and the query executor 606 (FIG. 6) generally performs the necessary mapping based on its knowledge of the data store 608 implementation.

In some embodiments, the AQP 610 (FIG. 6) records provenance information for each output A-Expression extracted from a processed implementation-independent query. Since a query may have multiple output A-Expressions, the aggregate provenance recording for a query includes the aggregation of the provenance information for individual output A-Expressions. A description of the provenance information recorded for each such output A-Expressions follows.

If an output A-Expression evaluates to a dimension set, the AQP 610 may record the table to which the dimension set resolves, or, one or more data collection records 832 (FIG. 8) corresponding to the table. Such data collection records may be further restricted based using the duration (".") registry operator. It will be appreciated that there can be a large number of data collections associated with a particular table and, therefore, it may be undesirable or impractical to record all such data collections. Accordingly, in some embodiments, evaluation is limited to certain time period (e.g., the preceding fifteen months) if a duration is not specified. The time period may be specified using an AQP parameter (e.g., "max-reported-collections") and/or based upon a default value.

If an A-Expression evaluates to one or more fields, the AQP 610 may record the tables to which the fields belong, or, one or more data collection records 832 (FIG. 8) corresponding to the tables. Thus, the provenance information for a field can be same as the provenance information for the table in which the field resides.

For example, referring to FIG. 10, assume that DimensionSet15 is associated with data collection objects DimensionSet15_DC1 and DimensionSet15_DC2. The provenance record for the A-Expression "ALL/Dimension Set15*Dimension2" would be <DimensionSet15_DC1, DimensionSet15_DC2>.

If the evaluation of an A-Expression involves evaluating derived tables/fields, the AQP 610 may additionally record one or more "provenance paths," which explain the derivation from the derived table to a non-derived table. Such tables may either be expressed directly, or indirectly through fields. A provenance path may be represented as a sequence <<Data Collection, Operator 0>, <Table 1, Operator 1>, <Table 2, Operator 2>, . . . , <Table N, Operator N>>, where the first entry indicates a data collection ("Data Collection") corresponding to the non-derived table, the last entry indicates the table the A-Expression resolved to ("Table N"), and intermediate entries (if any) indicate the chained derivation between the first entry and the last entry. The provenance path, and other provenance information, is reported by AQP 610 to the analytics platform 602, along with the query results.

For example, referring again FIG. 10, assume that DimensionSet15 is associated with data collection objects DimensionSet15_DC1 and DimensionSet15_DC2 and that DimensionSet14 is associated with data collection object DimensionSet14_DC. When processing the A-Expression "ALL/Dimension12*Dimension3," the AQP 610 would record two provenance paths:

<<DimensionSet15_DC1,op1>,<DimensionSet15_DC2,op1>,<DimensionSet13,op3>,<DimensionSet12>> and
<<DimensionSet14_DC,op1><DimensionSet13,op3>,<DimensionSet12>>.

In some embodiments, the AQP 610 assigns a unique identifier (e.g., a unique string value) to each output A-Expression. In the case where multiple A-Expressions are evaluated, the unique identifier can be used to match individually evaluated responses with a corresponding A-Expression.

It will be appreciated that the systems and techniques described above provide for flexible, ontology-assisted addressing, embedding such addressing in existing query languages such as widely used Structured Query Language (SQL), and returning results and provenance information of the results. The addressing technique includes a way to construct ontology based address expressions and methods to resolve the address expression to columns and tables in a data store. The address expression may be used in ad-hoc queries to retrieve contents from a key/value data store. This addressing technique is implemented over a knowledge registry. The addressing scheme offers several benefits stemming from the independence of the addressing scheme from the storage content and format.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A method for querying and retrieving data in a data store, the method comprising:
   receiving an implementation-independent query from a user, the received implementation-independent query including an input address expression (A-Expression) and an output A-Expression;
   providing an ontology associated with the received query, the ontology comprising a plurality of table entities corresponding to tables within the data store, each of the plurality of table entities having a plurality of field entities corresponding to columns within the data store;
   evaluating the input A-Expression using the ontology to resolve a table entity from the plurality of table entities and an input duration operator, wherein the table entity exists during a time duration defined by the input duration operator;
   evaluating the output A-Expression using the ontology to resolve field entities of the table entity;

generating a rewritten query using the resolved table entity, the resolved field entities, and the input duration operator, wherein the resolved table entity and the resolved field entities exist during the time duration defined by the input duration operator;

executing the rewritten query over the data store to retrieve query result data; and returning the query result data to the user.

2. The method of claim 1 wherein generating the rewritten query comprises substituting the input and output A-Expressions within the received query.

3. The method of claim 1 wherein executing the rewritten query over the data store comprises executing a Structured Query Language (SQL) query over a relational database.

4. The method of claim 1 wherein executing the rewritten query over the data source comprises executing an SQL query over a key/value store.

5. The method of claim 1 further comprising:
retrieving one or more data collection records, each data collection record associated with the resolved table entity and comprising one or more database row identifiers,
wherein generating a rewritten query comprises generating a rewritten query using the row identifiers.

6. The method of claim 5 further comprising generating provenance information comprising the output A-Expression and information identifying the one or more data collection records, wherein returning the query results data to the user further comprises returning the provenance information.

7. The method of claim 1 wherein the ontology further comprises dimension entities associated with the field entities.

8. The method of claim 7 wherein the input A-Expression includes a set of dimension entities, wherein evaluating the input A-Expression using the ontology to resolve a table entity from the plurality of table entities comprises locating a table entity from the plurality of table entities have field entities associated with all of the set of dimension entities.

9. The method of claim 7 wherein the ontology further comprises dimension set entities and data operator entities, each dimension set entity having a set of the plurality of dimension entities, ones of the dimension set entities reachable by other ones of the dimension set entities through ones of the data operator entities.

10. The method of claim 9 wherein the input A-Expression includes a dimension set entity, wherein evaluating the input A-Expression using the ontology to resolve a table entity from the plurality of table entities comprises determining ones of the dimension sets reachable by the dimension set entity of the input A-Expression.

11. The method of claim 7 wherein the input A-Expression includes a dimension entity, wherein evaluating the input A-Expression using the ontology to resolve a table entity from the plurality of table entities comprises locating a table entity from the plurality of table entities having a field entity associated with the dimension entity of the input A-Expression.

12. The method of claim 1 wherein the ontology further comprises tag entities, each of the tag entities associated with one or more of the field entities.

13. The method of claim 12 wherein the input A-Expression includes a tag entity, wherein evaluating the input A-Expression using the ontology to resolve a table entity from the plurality of table entities comprises locating a table entity from the plurality of table entities having a field entity associated with the tag entity of the input A-Expression.

14. A system for querying and retrieving data in a data store, the system comprising:
an analytics platform to receive an implementation-independent query from a user, the received query embedded with an address expression corresponding to an implementation-independent specification in the query, wherein the implementation-independent query includes an input duration operator;
a knowledge registry comprising an ontology;
an address expression query processor to:
evaluate the input address expression using the ontology to resolve a table entity with at least one field entity, the table entity corresponding to a table and at least one field within the data store, and generate a rewritten query using the table entity and at least one field entity, wherein the table entity and the at least one field entity exist during the time duration that the input duration operator specifies; and
a query executor to execute the rewritten query over the data store to retrieve query result data.

15. The system of claim 14 wherein the data store is a key/value store.

16. The system of claim 14 wherein the data store is a relational database and the rewritten query comprises a Structured Query Language (SQL) query.

17. The system of claim 14 wherein the data store is a key/value store and the rewritten query comprises an SQL query.

18. A method for implementation-independent querying and retrieving data in a data store, the method comprising:
receiving an implementation-independent query from a user, wherein the implementation-independent query includes an input duration operator;
providing an ontology associated with the received query, the ontology comprising a plurality of table entities corresponding to tables within the data store, each of the plurality of table entities having a plurality of field entities corresponding to columns within the data store;
embedding an address expression corresponding to an implementation-independent specification in the query, the address expression and ontology resolving at least one column or table between the query and the data store, wherein the at least one column or the table exist during the time duration that the input duration operator specifies;
executing the rewritten query over the data store to retrieve query result data; and
returning the query result data to the user.

19. The method of claim 18 wherein generating a rewritten query comprises exclusively utilizing the embedded address expression to rewrite fields mapped to the table entities and corresponding columns resolved by the address expression and ontology.

20. The method of claim 18 wherein the address expression is constructed with at least one or more data-independent operators including dimensions, dimension sets, tags, tag schemes, and set operators.

21. The method of claim 20 wherein the at least one or more data-independent operators comprises a reachability operator that takes as input a dimension set and returns one or more dimension sets reachable from the input dimension set through one or more data operators.

22. The method of claim 1, wherein the input duration operator is specified as at least one field and a pair of date-time value fields such that a first expression which includes the pair of date-time value fields resolves to a second expression which does not include the pair of time-date value fields, if the at least one field existed within the specified input duration.

23. The method of claim 1, wherein the input duration operator is specified as at least one field and a pair of date-time value fields such that a first expression which includes the pair of date-time value fields resolves to a second expression which does not include the pair of time-date value fields, if the at least one field had corresponding data values within the specified input duration.

24. The method of claim 1, wherein the input and output A-Expression comprises one or more registry operators wherein each of the one or more registry operators specify tables and the columns within the data store, and wherein each of the registry operators is defined independently from one or more implementations, according to the underlying database storage structure, of the A-Expression.

25. The method of claim 24, wherein the registry operators are configured to operate, indirectly from the tables and the columns in the date store, on a data schema or ontology stored in a knowledge registry, wherein each of the registry operators is constructed from at least one of the following ontological concepts: dimensions, dimension sets, tags, tag schemes, and set operators.

26. The method of claim 24, wherein at least one of the registry operators comprises:
 a first binary operator configured to receive one or more input tables and a dimension set as an input and returns a subset of the one or more input tables that contains all dimensions of the dimension set; and
 a second binary operator configured to receive one or more combinations of input tables/input fields, one or more dimensions, and one or more tags as inputs and return at least one field from the input tables/input fields that matches the dimensions and the tags.

* * * * *